(12) United States Patent
Takeda et al.

(10) Patent No.: US 12,621,094 B2
(45) Date of Patent: May 5, 2026

(54) TEMPORARY REFERENCE SIGNAL FOR FAST SECONDARY CELL ACTIVATION

(71) Applicant: QUALCOMM Incorporated, San Diego, CA (US)

(72) Inventors: Kazuki Takeda, Tokyo (JP); Changhwan Park, San Diego, CA (US); Jae Ho Ryu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 17/586,574

(22) Filed: Jan. 27, 2022

(65) Prior Publication Data

US 2022/0247529 A1 Aug. 4, 2022

Related U.S. Application Data

(60) Provisional application No. 63/143,662, filed on Jan. 29, 2021.

(51) Int. Cl.
*H04L 1/00* (2006.01)
*G01R 31/08* (2020.01)
(Continued)

(52) U.S. Cl.
CPC ........... *H04L 5/0048* (2013.01); *H04W 24/08* (2013.01); *H04W 72/0446* (2013.01); *H04W 72/23* (2023.01)

(58) Field of Classification Search
CPC ..... H04L 5/0048; H04L 5/001; H04L 5/0098; H04W 24/08; H04W 72/0446; H04W 72/23; H04W 8/24
See application file for complete search history.

(56) References Cited

U.S. PATENT DOCUMENTS 10,764,920 B2 9/2020 Yerramalli et al.
11,277,844 B2 3/2022 Fakoorian et al.
(Continued)

FOREIGN PATENT DOCUMENTS

CN 110149178 A * 8/2019 ............. H04L 5/001
CN 111903085 A 11/2020
(Continued)

OTHER PUBLICATIONS

Mediatek Inc: "Summary for TRS", R1-1801042, 3GPP TSG-RAN WG1 Meeting NR Ad Hoc, Vancouver, Canada, Jan. 22-26, 2018, 12 pages.
(Continued)

*Primary Examiner* — Edan Orgad
*Assistant Examiner* — Hidayat Dabiri
(74) *Attorney, Agent, or Firm* — Holland & Hart LLP

(57) ABSTRACT

Methods, systems, and devices for wireless communications are described. A user equipment (UE) may receive, from a base station, a secondary cell activation message that indicates a secondary cell is to be activated at the UE in addition to a primary cell. The UE may identify, based at least in part on the secondary cell activation message, a slot location of a first portion of aperiodic reference signals for cell activation measurements and a slot offset between the first portion of the aperiodic reference signals and a second portion of the aperiodic reference signals, the slot offset comprising non-consecutive slots with respect to the slot location. The UE may measure one or more characteristics of the secondary cell based at least in part on the aperiodic reference signals.

32 Claims, 18 Drawing Sheets

(51) Int. Cl.

| | |
|---|---|
| *G06F 11/00* | (2006.01) |
| *G08C 15/00* | (2006.01) |
| *H04J 1/16* | (2006.01) |
| *H04J 3/14* | (2006.01) |
| *H04L 5/00* | (2006.01) |
| *H04W 24/08* | (2009.01) |
| *H04W 72/0446* | (2023.01) |
| *H04W 72/23* | (2023.01) |

(56) References Cited

U.S. PATENT DOCUMENTS

| | | | | |
|---|---|---|---|---|
| 12,069,003 | B2 * | 8/2024 | Takeda | H04L 5/001 |
| 12,143,972 | B2 * | 11/2024 | Lei | H04W 72/0446 |
| 2011/0157221 | A1 | 6/2011 | Ptucha et al. | |
| 2012/0200667 | A1 | 8/2012 | Gay et al. | |
| 2019/0059054 | A1 * | 2/2019 | Lee | H04L 5/005 |
| 2019/0109750 | A1 * | 4/2019 | Nam | H04L 27/2613 |
| 2019/0174466 | A1 * | 6/2019 | Zhang | H04L 5/0057 |
| 2019/0215117 | A1 * | 7/2019 | Lee | H04L 5/0082 |
| 2020/0029315 | A1 | 1/2020 | Lin et al. | |
| 2020/0137602 | A1 | 4/2020 | Zhang et al. | |
| 2020/0236643 | A1 * | 7/2020 | Zhang | H04L 27/2655 |
| 2021/0044401 | A1 * | 2/2021 | Yoon | H04B 7/088 |
| 2021/0067296 | A1 | 3/2021 | Wang et al. | |
| 2021/0167911 | A1 | 6/2021 | Xiao et al. | |
| 2021/0273771 | A1 * | 9/2021 | Takeda | H04L 5/001 |
| 2022/0225251 | A1 * | 7/2022 | Yang | H04L 5/0051 |
| 2023/0059966 | A1 * | 2/2023 | Kyung | H04L 5/0051 |
| 2023/0336305 | A1 * | 10/2023 | Hakola | H04L 27/2613 |
| 2023/0422165 | A1 | 12/2023 | Sun et al. | |
| 2024/0113832 | A1 * | 4/2024 | Ryu | H04L 5/001 |

FOREIGN PATENT DOCUMENTS

| | | | |
|---|---|---|---|
| WO | WO-2019074742 | A2 | 4/2019 |
| WO | WO-2019160292 | A1 | 8/2019 |
| WO | WO2019195171 | A1 | 10/2019 |
| WO | WO-2020155166 | A1 * | 8/2020 ........ H04W 52/0235 |
| WO | WO-2021003678 | A1 | 1/2021 |
| WO | WO2021063400 | A1 | 4/2021 |

OTHER PUBLICATIONS

International Search Report and Written Opinion—PCT/US2022/014366—ISA/EPO—May 13, 2022.

Taiwan Search Report—TW111103970—TIPO—May 10, 2025.

Huawei et al., "UE Feedback Enhancements for HARQ-ACK", R1-2007565, 3GPP TSG RAN WG1 Meeting #103-e E-meeting, Oct. 26-Nov. 13, 2020, 8 Pages.

Isikdogan F., et al., "A Real Time Virtual Dressing Room Application Using Kinect", Computer Vision Course Project, Bogazici University, Jan. 2012, pp. 1-3.

LG Electronics: "Discussion on UE Feedback Enhancement for HARQ-ACK", 3GPP TSG RAN WG1 #103-e, R1-2008057, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, XP051946559, 5 Pages.

Pachoulakis I., et al., "Augmented Reality Platforms for Virtual Fitting Rooms", The International Journal of Multimedia & Its Applications (IJMA), vol. 4, No. 4, Aug. 2012, pp. 35-46.

Samsung: "On HARQ-ACK Reporting Enhancements", R1-2101201, 3GPP TSG RAN WG1 #104-e e-Meeting, Jan. 25-Feb. 5, 2021, pp. 1-8.

ETSI: "5G, NR, Radio Resource Control (RRC), Protocol specification (3GPP TS 38.331 version 16.3.1 Release 16)", ETSI TS 138 331, V16.3.1, Jan. 2021, pp. 1-915.

Moderator (Huawei): "[Draft] Summary#1 of efficient SCell activation/de-activation mechanism of NR CA", R1-2009800, 3GPP TSG RAN WG1 #103-e, E-Meeting, Oct. 26-Nov. 13, 2020, 54 Pages.

VIVO: "Discussion on efficient activation/de-activation mechanism for Scells", R1-2007697, 3GPP TSG-RAN WG1 Meeting #103-e, e-Meeting, Oct. 26-Nov. 13, 2020, pp. 1-3.

Mediatek Inc: "Efficient and Low Latency SCell Data Transmission for NR CA", 3GPP TSG RAN WG1 #98b, R1-1911436, Chongqing, China, Oct. 14, 2019-Oct. 20, 2019, Oct. 20, 2019, 17 Pages.

* cited by examiner gNB/PCell

205

SCell

*Scell Activation Message*

*Aperiodic Reference Signal (e.g., TRSs)*

210

215

←Slot→

1st
Portion

Slot Offset

2nd
Portion

Aperiodic
Reference Signal
220

200

*1st Portion*          *Slot Offset*          *2nd Portion*

Aperiodic
Reference Signal
305

300

D     U     U     U     U     D

Aperiodic
Reference Signal
405

400

Aperiodic
Reference Signal
505

Triggering DCI
510

1010

1020

1015

1005

1000

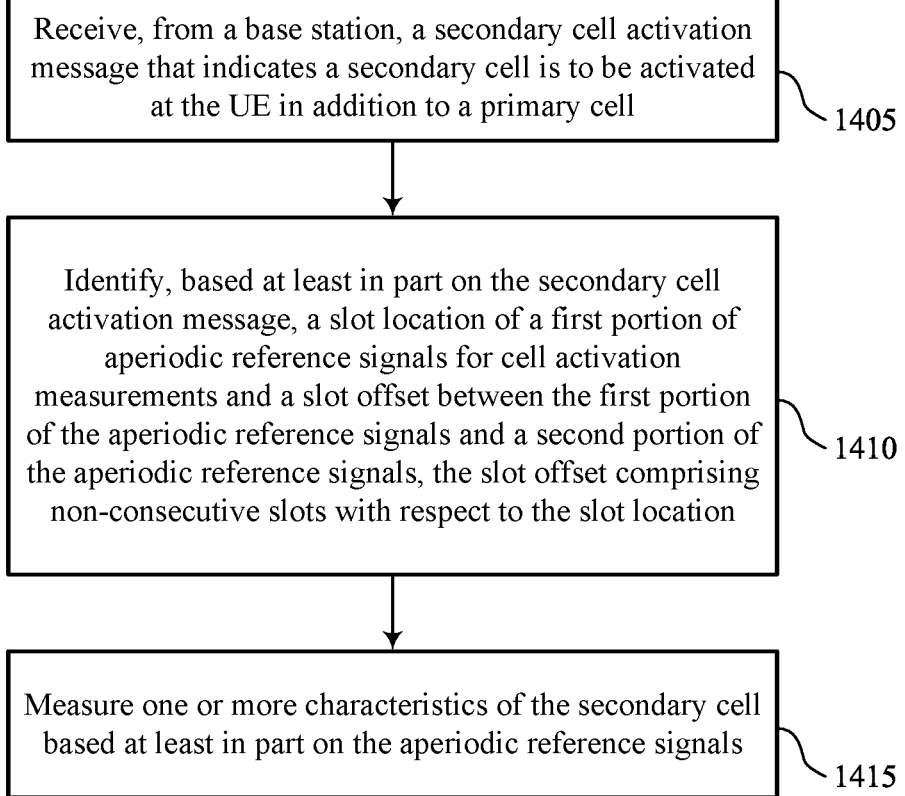

Receive, from a base station, a secondary cell activation message that indicates a secondary cell is to be activated at the UE in addition to a primary cell

1405

Identify, based at least in part on the secondary cell activation message, a slot location of a first portion of aperiodic reference signals for cell activation measurements and a slot offset between the first portion of the aperiodic reference signals and a second portion of the aperiodic reference signals, the slot offset comprising non-consecutive slots with respect to the slot location

1410

Measure one or more characteristics of the secondary cell based at least in part on the aperiodic reference signals

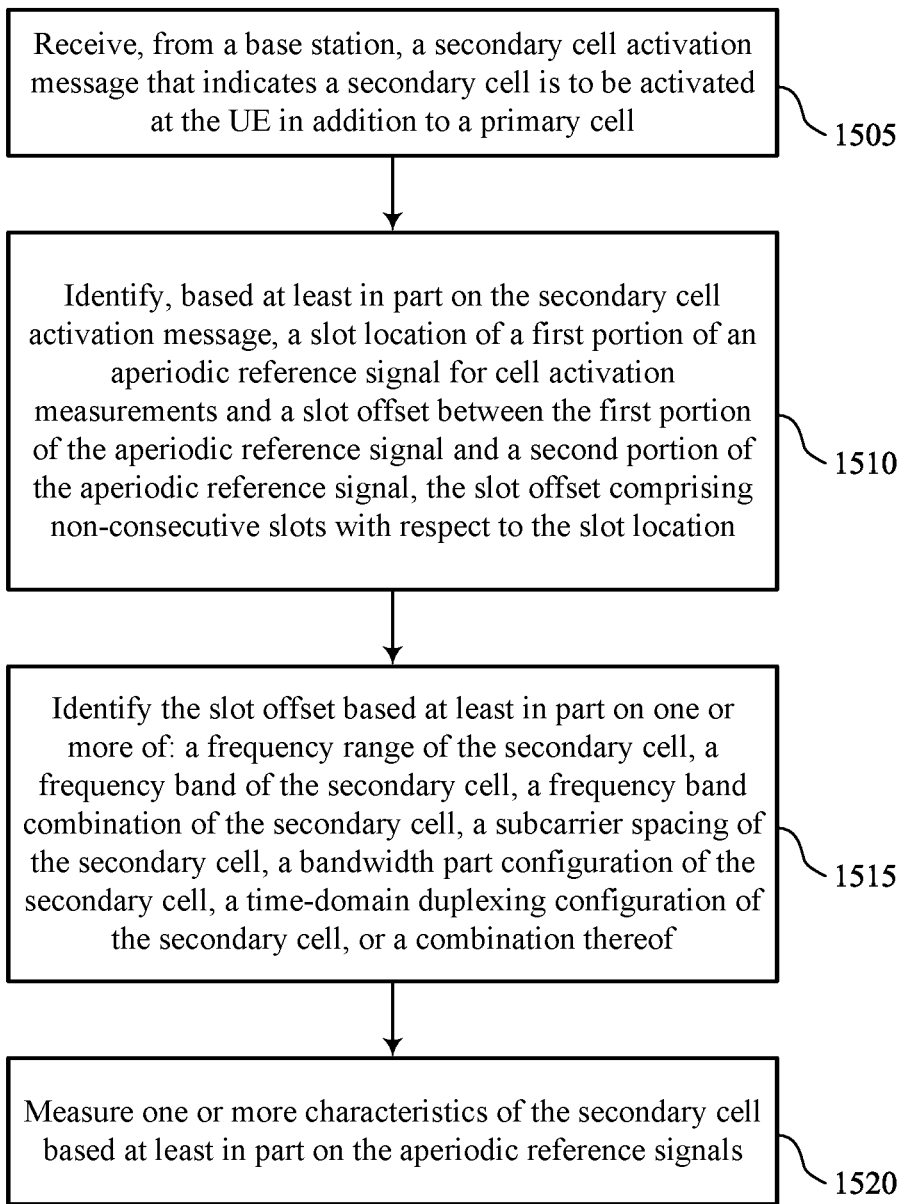

Receive, from a base station, a secondary cell activation message that indicates a secondary cell is to be activated at the UE in addition to a primary cell

1505

Identify, based at least in part on the secondary cell activation message, a slot location of a first portion of an aperiodic reference signal for cell activation measurements and a slot offset between the first portion of the aperiodic reference signal and a second portion of the aperiodic reference signal, the slot offset comprising non-consecutive slots with respect to the slot location

1510

Identify the slot offset based at least in part on one or more of: a frequency range of the secondary cell, a frequency band of the secondary cell, a frequency band combination of the secondary cell, a subcarrier spacing of the secondary cell, a bandwidth part configuration of the secondary cell, a time-domain duplexing configuration of the secondary cell, or a combination thereof

1515

Measure one or more characteristics of the secondary cell based at least in part on the aperiodic reference signals

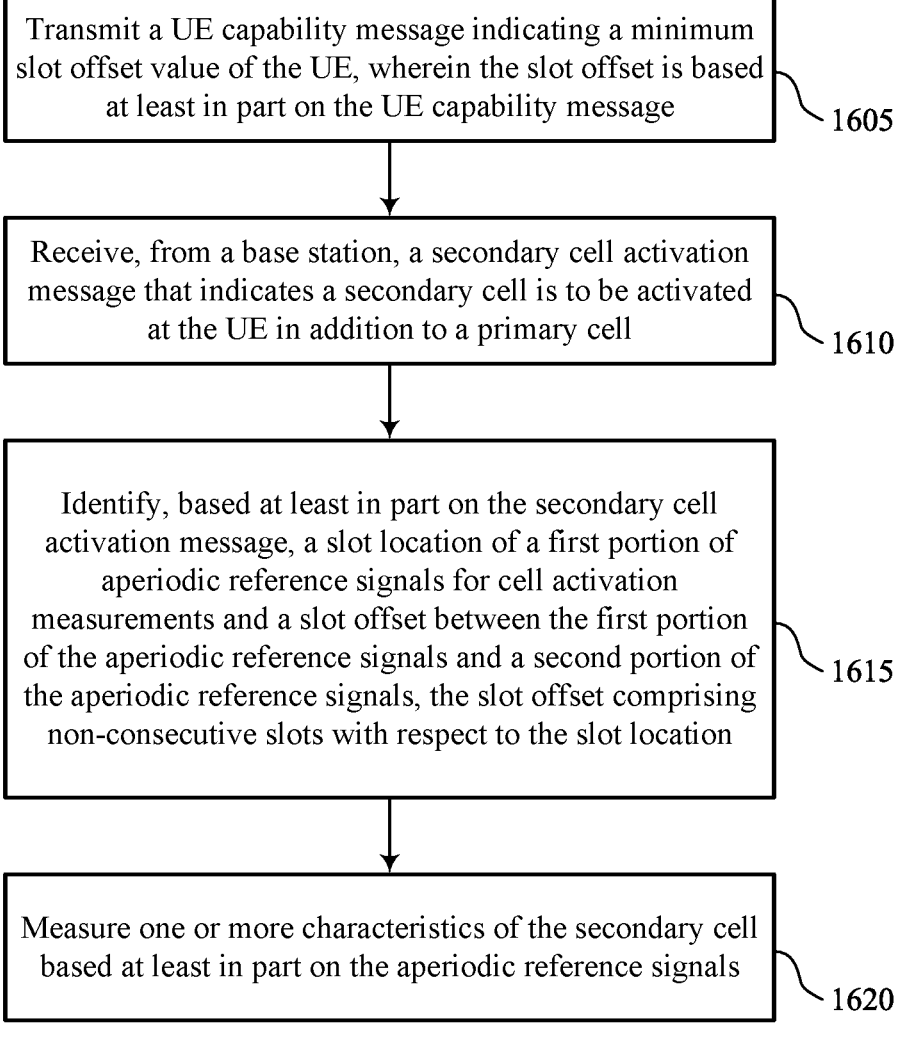

Transmit a UE capability message indicating a minimum slot offset value of the UE, wherein the slot offset is based at least in part on the UE capability message

1605

Receive, from a base station, a secondary cell activation message that indicates a secondary cell is to be activated at the UE in addition to a primary cell

1610

Identify, based at least in part on the secondary cell activation message, a slot location of a first portion of aperiodic reference signals for cell activation measurements and a slot offset between the first portion of the aperiodic reference signals and a second portion of the aperiodic reference signals, the slot offset comprising non-consecutive slots with respect to the slot location

1615

Measure one or more characteristics of the secondary cell based at least in part on the aperiodic reference signals

Figure 17:
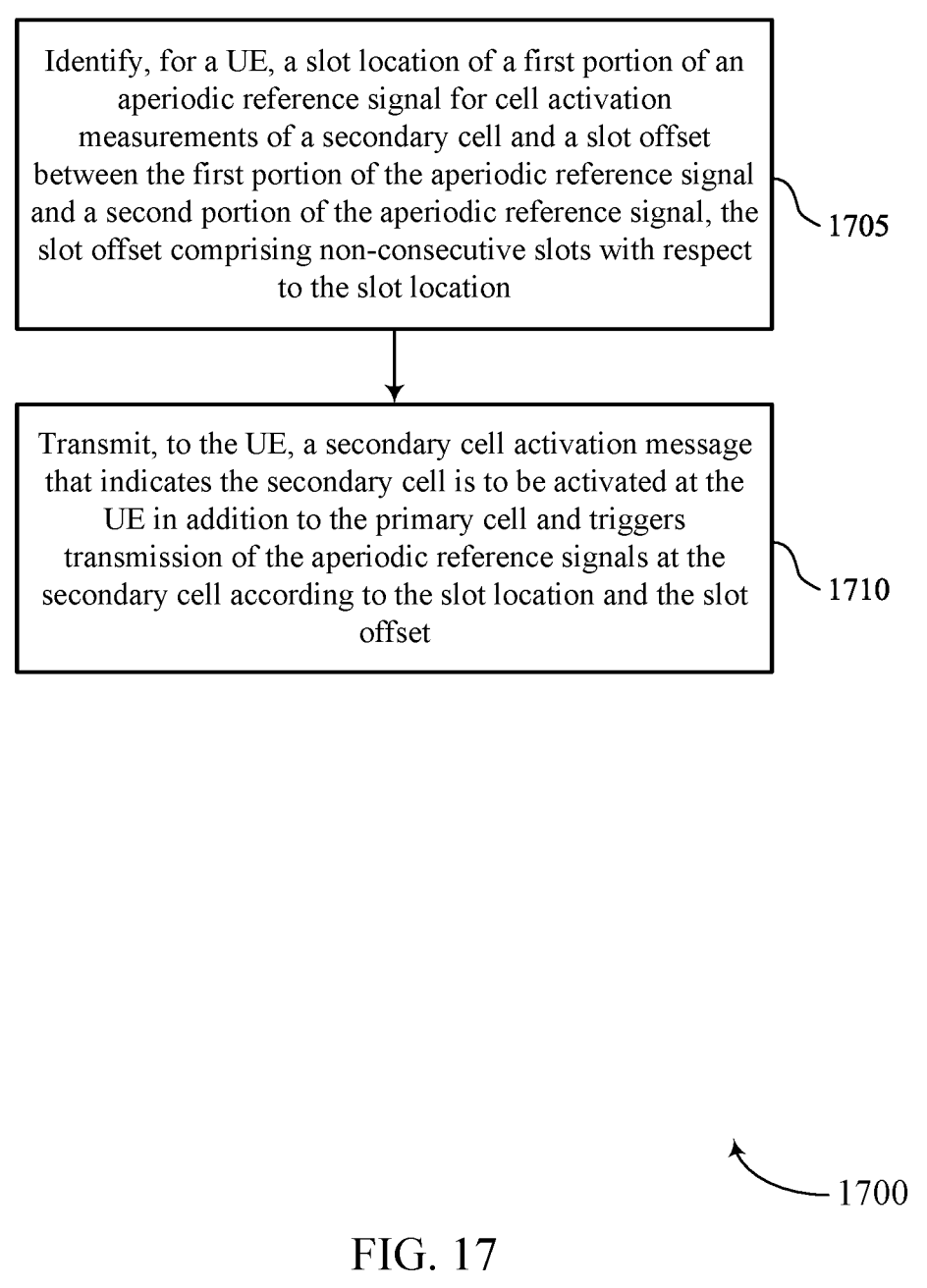

Identify, for a UE, a slot location of a first portion of an aperiodic reference signal for cell activation measurements of a secondary cell and a slot offset between the first portion of the aperiodic reference signal and a second portion of the aperiodic reference signal, the slot offset comprising non-consecutive slots with respect to the slot location

1705

Transmit, to the UE, a secondary cell activation message that indicates the secondary cell is to be activated at the UE in addition to the primary cell and triggers transmission of the aperiodic reference signals at the secondary cell according to the slot location and the slot offset

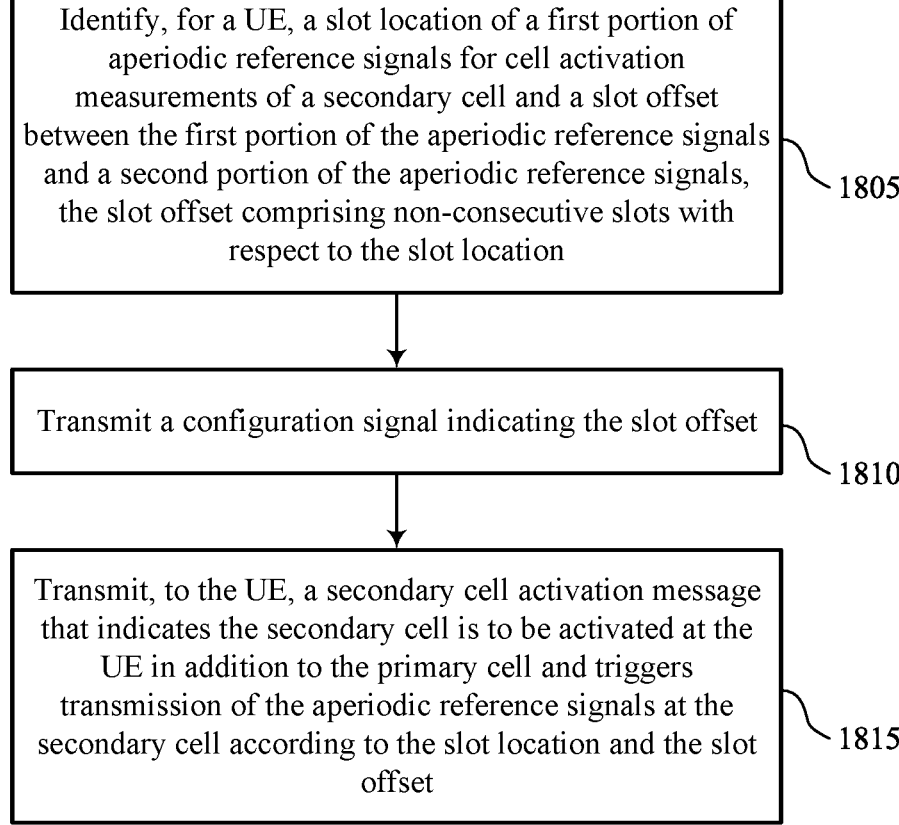

Identify, for a UE, a slot location of a first portion of aperiodic reference signals for cell activation measurements of a secondary cell and a slot offset between the first portion of the aperiodic reference signals and a second portion of the aperiodic reference signals, the slot offset comprising non-consecutive slots with respect to the slot location

1805

Transmit a configuration signal indicating the slot offset

1810

Transmit, to the UE, a secondary cell activation message that indicates the secondary cell is to be activated at the UE in addition to the primary cell and triggers transmission of the aperiodic reference signals at the secondary cell according to the slot location and the slot offset

TEMPORARY REFERENCE SIGNAL FOR FAST SECONDARY CELL ACTIVATION

CROSS REFERENCE

The present Application for Patent claims the benefit of U.S. Provisional Patent Application No. 63/143,662 by TAKEDA et al., entitled "TEMPORARY REFERENCE SIGNAL FOR FAST SECONDARY CELL," filed Jan. 29, 2021, assigned to the assignee hereof, and expressly incorporated by reference herein.

FIELD OF TECHNOLOGY

The following relates to wireless communications, including temporary reference signal for fast secondary cell activation.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support temporary reference signal for fast secondary cell (SCell) activation. Generally, the described techniques provide for improving activation of SCell(s) for a user equipment (UE) more quickly and efficiently. For example, a UE may receive a SCell activation message indicating that the SCell is being activated. The SCell activation message may be received from a primary cell (PCell), which may be associated with the same base station and/or a different base station than the to-be activated SCell(s). The UE may identify, e.g., based on the SCell(s) activation message and/or other configurations, a non-consecutive slot arrangement for aperiodic reference signals (e.g., a slot location of a slot n and the location of slot n+k based on the slot offset between slot n and slot n+k). That is, the UE may use the activation message to identify the slot location of slot n for a first portion of the aperiodic reference signals as well as the slot offset identifying slot n+k where a second portion of the aperiodic reference signals are transmitted by the to-be activated SCell(s). The UE may then measure the aperiodic reference signals from the SCell(s) using the associated resources, e.g., in the first portion of aperiodic reference signal in slot n and the slot offset identifying slot n+k where the second portion of aperiodic reference signals are, which constitutes non-consecutive slots. This may enable to the UE to synchronize with the SCell in order to perform wireless communications more quickly and efficiently.

A method for wireless communication at a UE is described. The method may include receiving, from a base station, a SCell activation message that indicates a SCell is to be activated at the UE in addition to a PCell, identifying, based on the SCell activation message, a slot location of a first portion of aperiodic reference signals for cell activation measurements and a slot offset between the first portion of the aperiodic reference signals and a second portion of the aperiodic reference signals, the slot offset including non-consecutive slots with respect to the slot location, and measuring one or more characteristics of the SCell based on the aperiodic reference signals. In some examples, the slot location may be for a first plurality of slots carrying the first portion of aperiodic reference signals and the slot offset may be between the first plurality of slots and a second plurality of slots carrying the second portion of the aperiodic reference signals, such as illustrated in FIG. 3. In some examples, the timing domain pattern (e.g., symbols) used for the first portion of the aperiodic reference signals carried in the first plurality of slots may be reused (e.g., the same) for the second portion of the aperiodic reference signals carried in the second plurality of slots.

An apparatus for wireless communication at a UE is described. The apparatus may include a processor, memory coupled with the processor, and instructions stored in the memory. The instructions may be executable by the processor to cause the apparatus to receive, from a base station, a SCell activation message that indicates a SCell is to be activated at the UE in addition to a PCell, identify, based on the SCell activation message, a slot location of a first portion of aperiodic reference signals for cell activation measurements and a slot offset between the first portion of the aperiodic reference signals and a second portion of the aperiodic reference signals, the slot offset including non-consecutive slots with respect to the slot location, and measure one or more characteristics of the SCell based on the aperiodic reference signals.

Another apparatus for wireless communication at a UE is described. The apparatus may include means for receiving, from a base station, a SCell activation message that indicates a SCell is to be activated at the UE in addition to a PCell, means for identifying, based on the SCell activation message, a slot location of a first portion of aperiodic reference signals for cell activation measurements and a slot offset between the first portion of the aperiodic reference signals and a second portion of the aperiodic reference signals, the slot offset including non-consecutive slots with respect to the slot location, and means for measuring one or more characteristics of the SCell based on the aperiodic reference signals.

A non-transitory computer-readable medium storing code for wireless communication at a UE is described. The code may include instructions executable by a processor to receive, from a base station, a SCell activation message that indicates a SCell is to be activated at the UE in addition to a PCell, identify, based on the SCell activation message, a slot location of a first portion of aperiodic reference signals for cell activation measurements and a slot offset between the first portion of the aperiodic reference signals and a second portion of the aperiodic reference signals, the slot offset including non-consecutive slots with respect to the slot location, and measure one or more characteristics of the SCell based on the aperiodic reference signal.

In some examples of the method, apparatuses, and non-transitory computer-readable medium described herein, the slot location includes a first slot including resources for the first portion of the aperiodic reference signal and the slot offset identifies a second slot including resources for the second portion of the aperiodic reference signal, the second slot including a non-consecutive slot with respect to the first slot.

In some examples of the method, apparatuses, and non-transitory computer-readable medium described herein, the resources for the first portion of the aperiodic reference signal during the first slot use a different time domain pattern than the resources for the second portion of the aperiodic reference signal during the second slot.

In some examples of the method, apparatuses, and non-transitory computer-readable medium described herein, the slot location includes a first set of multiple slots, each slot in the first set of multiple slots including resources for a first instance of the aperiodic reference signal, and the slot offset identifies a second set of multiple slots, each slot in the second set of multiple slots including resources for a second instance of the aperiodic reference signal, the second set of multiple slots including non-consecutive slots with respect to the first set of multiple slots.

In some examples of the method, apparatuses, and non-transitory computer-readable medium described herein, the resources for the first instance of the aperiodic reference signal during the first set of multiple slots use a different time domain pattern than the resources for the second instance of the aperiodic reference signal during the second set of multiple slots.

Some examples of the method, apparatuses, and non-transitory computer-readable medium described herein may further include operations, features, means, or instructions for identifying the slot offset based on one or more of: a frequency range of the SCell, a frequency band of the SCell, a frequency band combination of the SCell, a subcarrier spacing (SCS) of the SCell, a bandwidth part (BWP) configuration of the SCell, a time domain duplexing (RDD) configuration of the SCell, or a combination thereof.

Some examples of the method, apparatuses, and non-transitory computer-readable medium described herein may further include operations, features, means, or instructions for receiving a configuration signal indicating the slot offset.

In some examples of the method, apparatuses, and non-transitory computer-readable medium described herein, the configuration signal includes downlink control information (DCI) including a field indicating the slot offset, the slot location, or both.

Some examples of the method, apparatuses, and non-transitory computer-readable medium described herein may further include operations, features, means, or instructions for transmitting a UE capability message indicating a minimum slot offset value of the UE, where the slot offset may be based on the UE capability message.

Some examples of the method, apparatuses, and non-transitory computer-readable medium described herein may further include operations, features, means, or instructions for identifying the minimum slot offset value of the UE for at least one of a frequency range, a frequency band, a frequency band combination, a SCS, a BWP configuration, or a TDD configuration.

A method for wireless communication at a PCell is described. The method may include identifying, for a UE, a slot location of a first portion of aperiodic reference signals for cell activation measurements of a SCell and a slot offset between the first portion of the aperiodic reference signals and a second portion of the aperiodic reference signals, the slot offset including non-consecutive slots with respect to the slot location and transmitting, to the UE, a SCell activation message that indicates the SCell is to be activated at the UE in addition to the PCell and triggering transmission of the aperiodic reference signals at the SCell according to the slot location and the slot offset.

An apparatus for wireless communication at a PCell is described. The apparatus may include a processor, memory coupled with the processor, and instructions stored in the memory. The instructions may be executable by the processor to cause the apparatus to identify, for a UE, a slot location of a first portion of aperiodic reference signals for cell activation measurements of a SCell and a slot offset between the first portion of the aperiodic reference signals and a second portion of the aperiodic reference signals, the slot offset including non-consecutive slots with respect to the slot location and transmit, to the UE, a SCell activation message that indicates the SCell is to be activated at the UE in addition to the PCell and triggering transmission of the aperiodic reference signals at the SCell according to the slot location and the slot offset.

Another apparatus for wireless communication at a PCell is described. The apparatus may include means for identifying, for a UE, a slot location of a first portion of aperiodic reference signals for cell activation measurements of a SCell and a slot offset between the first portion of the aperiodic reference signals and a second portion of the aperiodic reference signals, the slot offset including non-consecutive slots with respect to the slot location and means for transmitting, to the UE, a SCell activation message that indicates the SCell is to be activated at the UE in addition to the PCell and triggering transmission of the aperiodic reference signals at the SCell according to the slot location and the slot offset.

A non-transitory computer-readable medium storing code for wireless communication at a PCell is described. The code may include instructions executable by a processor to identify, for a UE, a slot location of a first portion of aperiodic reference signals for cell activation measurements of a SCell and a slot offset between the first portion of the aperiodic reference signals and a second portion of the aperiodic reference signals, the slot offset including non-consecutive slots with respect to the slot location and transmit, to the UE, a SCell activation message that indicates the SCell is to be activated at the UE in addition to the PCell and triggering transmission of the aperiodic reference signal at the SCell according to the slot location and the slot offset.

In some examples of the method, apparatuses, and non-transitory computer-readable medium described herein, the slot location includes a first slot including resources for the first portion of the aperiodic reference signal and the slot offset identifies a second slot including resources for the second portion of the aperiodic reference signal, the second slot including a non-consecutive slot with respect to the first slot.

In some examples of the method, apparatuses, and non-transitory computer-readable medium described herein, the resources for the first portion of the aperiodic reference signal during the first slot use a different time domain pattern than the resources for the second portion of the aperiodic reference signal during the second slot.

In some examples of the method, apparatuses, and non-transitory computer-readable medium described herein, the slot location includes a first set of multiple slots, each slot in the first set of multiple slots including resources for a first instance of the aperiodic reference signal, and the slot offset identifies a second set of multiple slots, each slot in the second set of multiple slots including resources for a second instance of the aperiodic reference signal, the second set of multiple slots including non-consecutive slots with respect to the first set of multiple slots.

In some examples of the method, apparatuses, and non-transitory computer-readable medium described herein, the resources for the first instance of the aperiodic reference signal during the first set of multiple slots use a different time domain pattern than the resources for the second instance of the aperiodic reference signal during the second set of multiple slots.

Some examples of the method, apparatuses, and non-transitory computer-readable medium described herein may further include operations, features, means, or instructions for identifying the slot offset based on one or more of: a frequency range of the SCell, a frequency band of the SCell, a frequency band combination of the SCell, a SCS of the SCell, a BWP configuration of the SCell, a TDD configuration of the SCell, or a combination thereof.

Some examples of the method, apparatuses, and non-transitory computer-readable medium described herein may further include operations, features, means, or instructions for transmitting a configuration signal indicating the slot offset.

In some examples of the method, apparatuses, and non-transitory computer-readable medium described herein, the configuration signal includes DCI including a field indicating the slot offset, the slot location, or both.

Some examples of the method, apparatuses, and non-transitory computer-readable medium described herein may further include operations, features, means, or instructions for receiving a UE capability message indicating a minimum slot offset value of the UE, where the slot offset may be based on the UE capability message.

Some examples of the method, apparatuses, and non-transitory computer-readable medium described herein may further include operations, features, means, or instructions for identifying the minimum slot offset value of the UE for at least one of a frequency range, a frequency band, a frequency band combination, a SCS, a BWP configuration, or a TDD configuration.

BRIEF DESCRIPTION OF THE DRAWINGS

FIGS. 14 through 18 show flowcharts illustrating methods that support temporary reference signal for fast SCell activation in accordance with aspects of the present disclosure.

DETAILED DESCRIPTION

Figure 1:
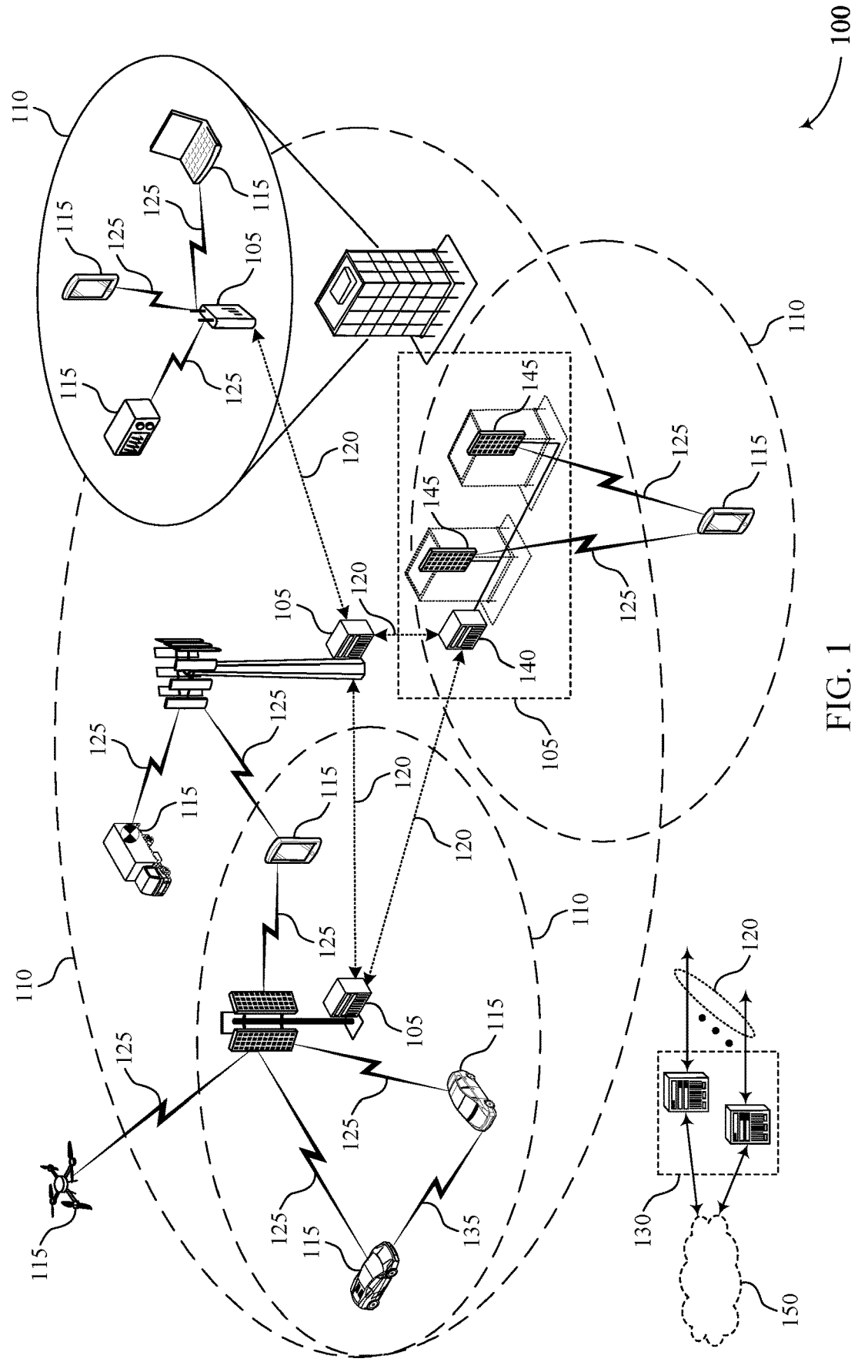
FIG. 1 illustrates an example of a wireless communication system that supports temporary reference signal for fast secondary cell (SCell) activation in accordance with aspects of the present disclosure.

Activation of secondary cell(s) (SCell)(s) generally takes a significant amount of time, due to a user equipment (UE) having to perform channel state measurements for an SCell to be activated based on periodic synchronization signal block (SSB) transmissions. For example, SSB transmissions in a new radio (NR) wireless communication system may occur much less frequently than cell-specific reference signal (CRS) transmissions in a long term evolution (LTE) wireless communication system, and thus SCell activation in NR can take substantially longer than CRS periodicity. Some wireless communications may support a temporary reference signal (e.g., an aperiodic reference signal) that can be transmitted on a SCell to allow for SCell activation without having to wait for a SSB transmission. The temporary reference signal may be an example of a tracking reference signal (TRS), a channel state information (CSI-RS), a beam reference signal (BRS), a phase tracking reference signal (PTRS), and/or a newly designed reference signal. However, such wireless communication systems are configured such that the temporary reference signal can be triggered by a medium access control (MAC) control element (CE), or downlink control information (DCI), but do not provide any mechanism regarding how such configuration signaling is used to configure the temporary reference signal, how configuration of the temporary reference signal is indicated to a UE, and the like.

Moreover, some SCell(s) being activated may be associated with a SSB periodicity of greater than a threshold (e.g., SSB periodicity >160 ms). In this situation, two SSBs are used—the first for automatic gain control (AGC) and the second for channel tracking (e.g., for channel performance measurements). Adopting this approach for the temporary reference signal approach discussed above may be problematic because the wireless communication systems permit the temporary reference signal resources only in one slot or in two consecutive slots. This may result in situations where the UE is unable to perform AGC and channel tracking using the TRS.

Aspects of the disclosure are initially described in the context of wireless communication systems. Generally, the described techniques provide for improving activation of SCell(s) for a UE more quickly and efficiently. For example, a UE may receive a SCell activation message indicating that the SCell is being activated. The SCell activation message may be received from a primary cell (PCell), which may be associated with the same base station and/or a different base station than the to-be activated SCell(s). The UE may identify, e.g., based on the SCell(s) activation message and/or other configurations, a non-consecutive slot arrangement for aperiodic reference signals (e.g., a slot location of a slot n and the location of slot n+k based on the slot offset k between slot n and slot n+k). In this example, both n and k are positive integers.

That is, the UE may use the activation message to identify the slot location of slot n for a first portion of the aperiodic reference signals as well as the slot offset identifying slot n+k where a second portion of the aperiodic reference signals are transmitted by the to-be activated SCell(s). The UE may then measure the aperiodic reference signals from the SCell(s) using the associated resources, e.g., in the first portion of aperiodic reference signals in slot n and the slot offset identifying slot n+k where the second portion of aperiodic reference signals are, which constitutes non-consecutive slots. This may enable to the UE to synchronize with the SCell in order to perform wireless communications more quickly and efficiently.

Aspects of the disclosure are further illustrated by and described with reference to apparatus diagrams, system diagrams, and flowcharts that relate to temporary reference signal for fast SCell activation.

FIG. 1 illustrates an example of a wireless communication system 100 that supports temporary reference signal for fast SCell activation in accordance with aspects of the present disclosure. The wireless communication system 100 may include one or more base stations 105, one or more UEs 115, and a core network 130. In some examples, the wireless communication system 100 may be a LTE network, an LTE-Advanced (LTE-A) network, an LTE-A Pro network, or a NR network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive, from a base station 105, a SCell activation message that indicates a SCell is to be activated at the UE 115 in addition to a primary cell. The UE 115 may identify, based at least in part on the SCell activation message, a slot location of a first portion of aperiodic reference signals for cell activation measurements and a slot offset between the first portion of the aperiodic reference signals and a second portion of the aperiodic reference signals, the slot offset comprising non-consecutive slots with respect to the slot location. The UE 115 may measure one or more characteristics of the SCell based at least in part on the aperiodic reference signals.

A base station 105 (e.g., when configured as a PCell of a UE 115) may identify, for a UE 115, a slot location of a first portion of aperiodic reference signals for cell activation measurements of a SCell and a slot offset between the first portion of the aperiodic reference signals and a second portion of the aperiodic reference signals, the slot offset comprising non-consecutive slots with respect to the slot location. The base station 105 may transmit, to the UE 115, a SCell activation message that indicates the SCell is to be activated at the UE 115 in addition to the primary cell and triggers transmission of the aperiodic reference signals at the SCell according to the slot location and the slot offset.

Figure 2:
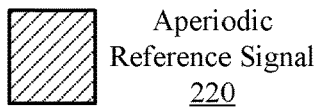
FIG. 2 illustrates an example of a wireless communication system that supports temporary reference signal for fast SCell activation in accordance with aspects of the present disclosure.

FIG. 2 illustrates an example of a wireless communication system 200 that supports temporary reference signal for fast SCell activation in accordance with aspects of the present disclosure. Wireless communication system 200 may implement aspects of wireless communication system 100. Wireless communication system 200 may include base station 205, base station 210, and/or UE 215, which may be examples of the corresponding devices described herein.

That is, in some aspects base station 205 may be configured as a PCell for UE 215 and base station 210 may be a SCell being activated for UE 215 (e.g., a to-be-activated SCell). However, it is to be understood that the PCell and SCell(s) being activated for UE 215 may be associated with the same base station and/or may be associated with different base stations. In the example where the PCell and SCell are associated with different base stations, such base stations may coordinate aspects of communications with UE 215 wirelessly and/or via a wired connection (e.g., via a backhaul connection).

Some wireless communication systems may support, in some situations, a temporary reference signal being supported to expedite the activation process during SCell activation to improve efficiency. The temporary reference signal may be supported for SCell activation in, for example, frequency range one (FR1) or frequency range two (FR2). Broadly, the temporary reference signal may support functionalities related to AGC settling, time and/or frequency tracking/tuning during SCell activation, and the like.

In some aspects, the temporary reference signal may also be referred to as an aperiodic reference signal 220, which may be an example of a TRS, an aperiodic CSI-RS, a persistent CSI-RS, a semi-persistent CSI-RS, a sounding reference signal (SRS), a reference signal based on PSS/SSS, and the like. Other examples of reference signal types that may be configured as an aperiodic reference signal 220 include, but are not limited to, a phase tracking reference signal, a beam tracking/management reference signal, and the like. Accordingly, the terms TRS, aperiodic reference signal, temporary reference signal, and the like, may be used interchangeably herein.

Accordingly, in some examples a TRS may be selected as the temporary reference signal (e.g., aperiodic reference signal 220) for SCell activation. In some examples, the temporary reference signal may be triggered by DCI, MAC CE, and the like. UE 215 may measure the triggered temporary reference signal during the SCell activation procedure no earlier than within a configured time threshold (e.g., no earlier than a slot m).

Conventionally, upon receiving the SCell activation command in a slot, UE 215 may support transmitting a valid CSI report and applying the actions related to the SCell activation command for the SCell being activated no later than in slot $$n + \frac{T_{HARQ} + T_{activation\_time} + T_{CSI\_Reporting}}{NR \text{ Slot Length}} \cdot T_{HARQ}$$

may refer to the timing (in ms) between the downlink data transmission and the acknowledgment of the downlink data transmission (e.g., HARQ-ACK feedback). $T_{activation\_time}$ may refer to the SCell activation delay in ms. If the SCell being activated is known and belongs to FR1, $T_{activation\_time}$ may be $T_{FirstSSB}+5$ ms if the SCell measurement cycle is equal to or smaller than 160 ms (e.g., to support fine tracking) or $T_{FirstSSB\_Max}+T_{rs}+5$ ms if the SCell measurement cycle is larger than 160 ms (e.g., to support AGC plus fine tracking). If the SCell is unknown and belongs to FR1, provided that certain conditions are satisfied, $T_{activation\_time}$ may be $T_{FirstSSB\_Max}+T_{SMTC\_Max}+2*T_{rs}+5$ ms (e.g., to support AGC, fine tracking, and SSB detection). $T_{rs}$ may generally refer to the SSB-based measurement and timing configuration (SMTC) periodicity of the SCell being activated if the UE has been provided with an SMTC configuration for the SCell in the SCell addition message. Otherwise, $T_{rs}$ may refer to the SMTC configured in the measObjectNR having the same SSB frequency and subcarrier spacing. If UE 215 is not provided SMTC configuration or measurement object on this frequency, the requirement which involves $T_{rs}$ may be applied with $T_{rs}$ being equal to 5 ms assuming the SSB transmission periodicity is 5 ms. $T_{FirstSSB}$ may refer to the time to the end of the first complete SSB burst indicated by the SMTC after slot $$n + T_{HARQ} + \frac{T_{HARQ} + 3 \text{ ms}}{NR \text{ slot length}} \cdot T_{FirstSSB\_Max}$$

may refer to the time to the end of the first complete SSB burst indicated by the SMTC after slot $$n + T_{HARQ} + \frac{T_{HARQ} + 3 \text{ ms}}{NR \text{ slot length}}.$$

This may fulfill the requirement that, in FR1 and in case of intra-band SCell activation, the occasion when all active serving cells and SCells being activated or released are transmitting SSB burst in the same slot. In the case of inter-band SCell activation, this may refer to the first occasion when the SCell being activated is transmitting an SSB burst. In FR2, this may refer to the occasion when all active serving cells and SCells being activated or released are transmitting SSB burst in the same slot.

Accordingly and for an SCell activation using a temporary reference signal in FR1 and with a certain condition (e.g., SCell measurement cycle <=160 ms), the SCell activation delay may be equal to:

$$\frac{T_{HARQ} + T_{activation\_time} + T_{CSI\_Reporting}}{NR \text{ Slot Length}}.$$

Again, $T_{HARQ}$ generally refers to the timeline until HARQ-ACK is transmitted. $T_{Activation\_time}$ generally refers to $T_{FirstTempRS}$+5 ms, where $T_{FirstTempRS}$ is the time to the start or end of the temporary reference signal after $n+T_{HARQ}$+3 ms. $T_{CSI\ Reporting}$ generally refers to the delay until the first available CSI report including uncertainties of a CSI resource in a CSI report.

Accordingly, in some examples the temporary reference signal may be a TRS (e.g., a non-zero power (NZP)-CSI-RS resource set) configured with a parameter trs-Info. Conventionally, this may include two NZP-CSI-RS resources (on two OFDM symbols) being configured in a slot or four NZP-CSI-RS resources being configured in two consecutive slots. The TRS may span over the bandwidth of the downlink BWP, which will be active when the SCell is activated (e.g., at least initially). The downlink BWP may correspond to the first-active-DL-BWP-id configured for UE 215.

The slot where the temporary reference signals are transmitted, the NZP-CSI-RS resource set index, or any of the combinations, may be indicated by the triggering signaling for the temporary reference signal. In one option this may include the triggering signaling being conveyed in a MAC CE carried by PDSCH. For example, the MAC CE triggering the temporary reference signal may be carried by the PDSCH that also carries the MAC CE activating the SCell. In another example the MAC CE triggering the temporary reference signal may be indicated by a PDSCH that is different from the PDSCH that carries the MAC CE activating the SCell. Another option may include the trigger signaling being conveyed in a DCI. For example, this may include the DCI scheduling the PDSCH that carries the MAC CE activating the SCell. In another example, this may include a DCI other than the DCI scheduling the PDSCH that carries the MAC CE activating the SCell.

According to such conventional techniques, the temporary reference signal time domain allocations may generally consist of two CSI-RS resources being configured within a slot or four CSI-RS resources being configured into consecutive slots (which may be the same across the two consecutive slots). This may be defined by a higher layer parameter CSI-RS-resourceMapping.

Accordingly, fast SCell activation may be improved using temporary reference signal configurations. In this context, the SCell activation delay may correspond to:

$$\frac{T_{HARQ} + T_{activation\ time} + T_{CSI\ Reporting}}{NR\ slot\ length} \cdot T_{HARQ}$$

may again correspond to the timeline until ACK is transmitted. $T_{activation\ time}$ may generally refer to $T_{temp\ RS}$+5 ms, where $T_{temp\ RS}$ is the time to the TRS after $n+T_{HARQ}$+3 ms. In some aspects, the activation time may correspond to the time between UE 215 transmitting HARQ-ACK for the activation command, the time it takes UE 215 to measure the TRS, and the time until UE 215 is ready to transmit CSI-RS reporting.

While this approach may be suitable for an SCell being activated with an SCell measurement cycle<=160 ms, other issues may arise for an SCell being activated with the SCell measurement cycle>160 ms. For an SCell measurement cycle>160 ms, two SSBs must be used. Since the two SSBs are separated in the time domain by at least 5 ms, UE 215 has sufficient time to process AGC (e.g., using the first SSB) and to track sequentially (e.g., using the second SSB for tracking/fine tuning). However, the temporary reference signal techniques discussed above are generally limited such that the NZP-CSI-RS resources are present either in one slot or in two consecutive slots. That is, since the NZP-CSI-RS resources are contained within a short duration (e.g., up to within two slots), UE 215 may not have sufficient time to process AGC and also perform fine tracking. That is, the slot duration (e.g., NR slot length) may be 1 ms, 0.5 ms, 0.25 ms, and 0.125 ms for SCS of 15 kHz, 30 kHz, 60 kHz, and 120 kHz, respectively. Limiting configuration for the temporary reference signal resources to within a single slot or to span two consecutive slots may not provide sufficient time for UE 215 to perform AGC operations and then fine tuning using the temporary reference signals.

Accordingly, aspects of the described techniques provide various mechanisms for SCell activation using temporary reference signals across non-consecutive slots. For example, base station 205 (which may be operating as a PCell for UE 215) may determine that base station 210 (e.g., an SCell in this example) is to be activated for UE 215. Based on the SCell being activated for UE 215, base station 205 may identify a slot location of a first portion of an aperiodic reference signal 220 for cell activation measurements and a slot offset between the first portion of the aperiodic reference signal 220 and a second portion of the aperiodic reference signal 220. That is, the slot location of the first portion of the aperiodic reference signals may refer to a first slot (and/or first plurality of slots) in which resources for the aperiodic reference signal 220 are allocated. The second portion of the aperiodic reference signals may refer to a second slot (and/or second plurality of slots) in which resources for the aperiodic reference signal 220 are also allocated. The slot offset may correspond to the number of slots (e.g., separation the time domain) between the first portion of the aperiodic reference signal 220 and the second portion of the aperiodic reference signal 220. As illustrated in FIG. 2, the slot offset generally spans non-consecutive slots with respect to the slot location.

Base station 205 may then transmit an SCell activation message to UE 215 indicating that base station 210 (e.g., the SCell) is to be activated in addition to the PCell (e.g., base station 205 in this example). In some aspects, the SCell activation message may also trigger transmission of the aperiodic reference signal 220 at the SCell according to the slot location and the slot offset. For example, the SCell activation message may be transmitted or otherwise conveyed in a DCI and/or MAC CE (e.g., the DCI scheduling the MAC CE indicating SCell activation and/or in a different DCI). If the PCell and SCell are controlled or implemented by the same base station 205, the base station may use the SCell activation message as a time trigger or other reference on which the timing of the aperiodic reference signal 220 is based. Alternatively, if the PCell and SCell are controlled or implemented by different base stations 205, the base station 205 implementing the PCell may coordinate with the base station implementing the SCell such that the SCell activation message is a signal or trigger to the base station implementing the SCell to transmit the aperiodic reference signal 220 at the SCell.

UE 215 may identify the slot location for the first portion of the aperiodic reference signal 220 for cell activation measurements and the slot offset between the first portion and the second portion of the aperiodic reference signal 220. For example, UE 215 may identify the slot location and the slot offset based on the SCell activation message transmitted from base station 205. Accordingly, UE 215 may measure or otherwise determine various characteristics of the SCell using aperiodic reference signal 220. For example, UE 215 may measure or otherwise perform AGC actions using the first portion of the aperiodic reference signal 220 transmitted from base station 210 in the slot(s) corresponding to the slot location. UE 215 may measure or otherwise perform fine tuning (e.g., tracking) using the second portion of the aperiodic reference signal 220 transmitted from base station 210 in the slot(s) corresponding to the slot offset in relation to the slot location (e.g., during the second portion). Accordingly, UE 215 may transmit a CSI report to base station 210 indicating the results of the measurements in order to activate base station 210 as a SCell for UE 215.

Accordingly, wireless communication system 200 illustrates an example where a temporary reference signal is split into two parts, with the first part (e.g., the first portion) being located in slot n and the second part (e.g., the second portion) being located in slot n+k, wherein k>=0. This may include NZP-CSI-RS resources on the same set of OFDM symbols being configured in different slots that are non-consecutive with respect to each other. That is, the slot location may correspond to a first slot including resources for the first portion of the aperiodic reference signal 220, where the slot offset identifies a second slot including resources for the second portion of the aperiodic reference signal 220. Again, the first slot and second slot may be non-consecutive slots with respect to each other (e.g., there may be at least one slot between slot n including the first portion and slot n+k including the second portion). In some examples, the temporary reference signals (e.g., the aperiodic reference signal 220) may be configured such that multiple NZP-CSI-RS resources are configured, with some resources being configured in slot n and the other resources being configured in slot n+k, where k>=0. That is, the time domain patterns of the NZP-CSI-RS resources in slot n and those in slot n+k may not necessarily be identical. Accordingly, in this example the resources for the first portion of the aperiodic reference signal 220 during the first slot may use a different time domain pattern than the resources for the second portion of the aperiodic reference signal 220 during the second slot.

In another example (described in more detail with reference to FIG. 3), configuring the temporary reference signals may include repeating two TRSs where the first TRS starts from slot n (or ends at slot n) and the second TRS starts from slot n+k, where k>=0. That is, in this example the slot location may include a first plurality of slots, each slot in the first plurality of slots including resources for a first instance of the aperiodic reference signal 220. In this example, the slot offset may identify a second plurality of slots, with each slot in the second plurality of slots including resources for a second instance of the aperiodic reference signal 220. Again the time domain separation between the first plurality of slots and the second plurality of slots may span non-consecutive slots.

In some examples, slot n may be determined by a higher layer configured offset from the slot where the triggering PDCCH is detected. Multiple values may be configured. For example, a DCI field (e.g., CSI request) may be configured to implicitly and/or explicitly indicate at least one of the slot location and/or slot offset values.

In some aspects, the necessary time gap (e.g., the slot offset) between the first portion and the second portion of the temporary reference signals may depend on how much time is needed for UE 215 to conduct AGC settling. Accordingly, aspects of the described techniques may be based on UE 215 reporting its capability of a minimal configurable value of k (e.g., the slot offset) to the network. Accordingly, this may include UE 215 transmitting a UE capability message identifying or otherwise indicating a minimum slot offset value of UE 215. In one example, UE 215 may report its minimal configurable value of k (e.g., its minimum slot offset value) based on various parameters. Examples of the parameters include, but are not limited to, the FR, a frequency band, a frequency band combination, or SCS, alone or in any combination, of the to-be-activated SCell. Accordingly, when reporting its capability, UE 215 may, in one option, report to the minimal configurable value of k for each FR, each frequency band, each frequency band combination, each SCS, and the like. This may mean that UE 215 reports multiple values of the minimal configurable value of k, with each reported value being for a particular case (e.g., parameter).

In another example, UE 215 may report a minimum configurable value of k (e.g., its minimum slot offset value) that is common for some FRs, frequency bands, frequency band combinations, or SCSs. Accordingly, UE 215 may report a minimum configurable value of k, which may be interpreted in different ways for different cases (e.g., for different parameters). As one-limiting example, if UE 215 reports in its UE capability message a minimum configurable value of k=2, this may be interpreted as two slots for a particular SCS (e.g., if SCS=30 kHz, then two slots may correspond to 1 ms). The 1 ms may be interpreted as a necessary time gap for another SCS. For example, if SCS=60 kHz, the minimum configurable value of k may be considered as 4, since UE 215 reports k=2 for reference SCS=30 kHz. Base station 205 may receive the UE capability message and identify or otherwise select the slot offset configuration of the temporary reference signals based on the UE capability message.

In some scenarios, UE 215 may be configured with SMTC for the to-be-activated SCell (e.g., for base station 210) and there may be at least one serving cell on the same frequency band as the to-be-activated SCell. In this situation, UE 215 may not be required to monitor or may not expect a TRS triggering DCI.

Figure 3:
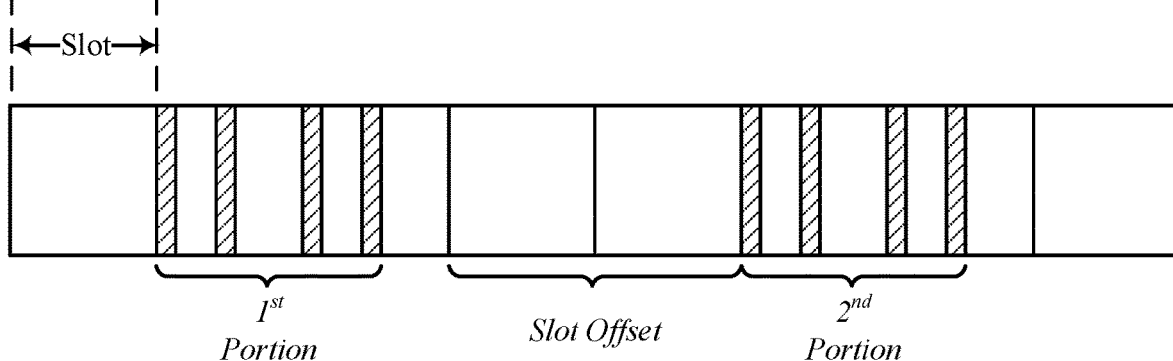
FIG. 3 illustrates an example of a aperiodic reference signal configuration that supports temporary reference signal for fast SCell activation in accordance with aspects of the present disclosure.
Figure 3:
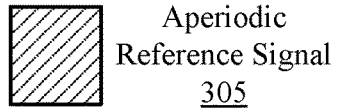
Figure 3:
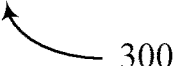

FIG. 3 illustrates an example of an aperiodic reference signal configuration 300 that supports temporary reference signal for fast SCell activation in accordance with aspects of the present disclosure. Aperiodic reference signal configuration 300 may implement aspects of wireless communication systems 100 and/or 200. Aspects of aperiodic reference signal configuration 300 may be implemented at or implemented by a UE and/or base station, which may be examples of corresponding devices herein.

As discussed above, aspects of the described techniques provide for a base station (e.g., a PCell) to trigger transmissions of temporary reference signals (e.g., aperiodic reference signal 305) from an SCell being activated for a UE, with the aperiodic reference signal 305 being in non-consecutive slots. That is, the PCell may transmit an SCell activation message indicating that the SCell is to be activated at the UE in addition to the PCell. The SCell activation message may indicate and/or trigger identification of a slot location of a first portion of an aperiodic reference signal 305 for cell activation measurements (e.g., AGC) as well as a slot offset between the first portion of the aperiodic reference signal 305 and a second portion of the aperiodic reference signal 305 that is also used for cell activation measurements (e.g., fine tuning/tracking). The slot offset may correspond to a number of slots between the first portion and the second portion of the aperiodic reference signal 305. As illustrated in FIG. 3, the slot location may correspond to the slot(s) holding resources for the first portion of the aperiodic reference signal 305, which is a non-consecutive slot with respect to the slot(s) holding resources for the second portion of the aperiodic reference signal 305. The SCell activation message may be carried or otherwise conveyed, implicitly and/or explicitly, via a DCI and/or MAC CE.

Accordingly, aspects of the described techniques may include the base station and/or UE determining the location of k (e.g., the slot offset) for slot n+k (e.g., the second portion of the aperiodic reference signal 305). That is, the slot offset may be referenced as k, where slot(s) n corresponds to the first portion of the aperiodic reference signal 305 and slot(s) n+k corresponds to the second portion of the aperiodic reference signal 305. Various techniques may be utilized for identifying and/or conveying an indication of the value of k. As discussed above, in some examples the value of k may depend on the FR, the frequency band, the frequency band combination, SCS, the BWP configuration, a TDD UL-DL configuration, and the like, of the to-be-activated SCell. Accordingly, the value of k may be based on UE capability signaling, in some examples.

A first option may include an implicit approach to identify and/or indicate the value of k (e.g., the slot offset). Broadly, this may include the base station (e.g., PCell) and/or UE identifying the slot offset based on the FR of the SCell, the frequency band of the SCell, a frequency band combination of the SCell, an SCS of the SCell, a BWP configuration of the SCell, a TDD configuration of the SCell, and the like. For example, the PCell and/or UE may determine the value of k based on the FR, frequency band, frequency band combination, or SCS for the to-be-activated SCell BWP configuration, TDD configuration, and the like.

As one non-limiting example, if the to-be-activated SCell is configured for the FR1 frequency band, then k may be set to 2, where if the to-be-activated SCell is configured for the FR2 frequency band, then k may be set to 3. As another non-limiting example, if the to-be-activated SCell uses SCS 15/30 kHz, then k may be set to 2, where if the to-be-activated SCell uses SCS 60/120 kHz, then k may be set to 3.

A second option may include an explicit approach where the value of n and/or k are explicitly signaled. For example, a higher layer parameter may be used to identify slot n+k. For a TRS based SCell activation (e.g., a SCell activation using aperiodic reference signal 305), the UE may receive a DCI format having a CSI request field, where the CSI request field indicates to the UE that the aperiodic TRS is being triggered on the to-be-activated SCell as well as where the aperiodic TRS begins (e.g., slot n is indicated together with k). That is, the combination of {n,k} values may be identified by the CSI request field. In one non-limiting example, the CSI request field values may include a field value of "00" indicating {4,2} (e.g., n=4, k=2), a field value of "01" indicating {5,2}, a field value of "10" indicating {4,3}, and a field value of "11" indicating {5,3}. Accordingly, the PCell may transmit a configuration signal to the UE indicating the slot offset, with the configuration signal including the DCI having a field indicating the slot offset and/or the slot location.

Aperiodic reference signal configuration 300 illustrates an example where the slot location includes a first plurality of slots (with two slots being shown by way of example only) being associated with the first portion of the aperiodic reference signal 305 (e.g., each slot in the first plurality of slots may include resources for a first instance of the aperiodic reference signal). In the non-limiting example illustrated in FIG. 3, the first plurality of slots spans two slots, with each slot including resources for the first instance (with two instances per/slot being shown by way of example only) of the aperiodic reference signal 305. The slot offset in this example may identify a second plurality of slots (with two slots being shown by way of example only) being associated with the second portion of the aperiodic reference signal 305 (e.g., each slot in the second plurality of slots may include resources for a second instance of the aperiodic reference signal 305). In the non-limiting example illustrated in FIG. 3, the second plurality of slots spans two slots, with each slot including resources for the second instance (with two instances per/slot being shown by way of example only) of the aperiodic reference signal 305. Accordingly, aperiodic reference signal configuration 300 illustrates an example where the temporary reference signal includes repeating two TRSs that start from slot n (or ends at slot n) and the second TRSs that start at slot n+k, wherein k>=0.

Figure 4:
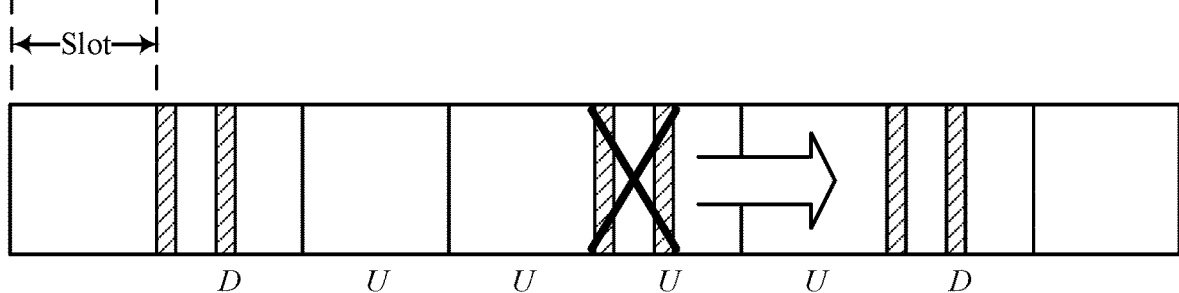
FIG. 4 illustrates an example of a aperiodic reference signal configuration that supports temporary reference signal for fast SCell activation in accordance with aspects of the present disclosure.
Figure 4:
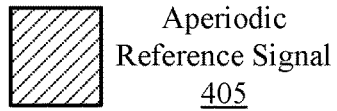
Figure 4:
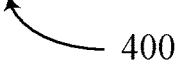

FIG. 4 illustrates an example of a aperiodic reference signal configuration 400 that supports temporary reference signal for fast SCell activation in accordance with aspects of the present disclosure. Aperiodic reference signal configuration 400 may implement aspects of wireless communication systems 100 and/or 200 and/or aperiodic reference signal configuration 300. Aspects of aperiodic reference signal configuration 400 may be implemented at or implemented by a UE and/or base station, which may be examples of corresponding devices herein.

As discussed above, aspects of the described techniques provide for a base station (e.g., a PCell) to trigger transmissions of temporary reference signals (e.g., aperiodic reference signal 405) from an SCell being activated for a UE, with the aperiodic reference signal 405 being in non-consecutive slots. That is, the PCell may transmit an SCell activation message indicating that the SCell is to be activated at the UE in addition to the PCell. The SCell activation message may indicate and/or trigger identification of a slot location of a first portion of an aperiodic reference signal 405 for cell activation measurements (e.g., AGC) as well as a slot offset between the first portion of the aperiodic reference signal 405 and a second portion of the aperiodic reference signal 405 that is also used for cell activation measurements (e.g., fine tuning/tracking). The slot offset may correspond to a number of slots between the first portion and the second portion of the aperiodic reference signal 405. As illustrated in FIG. 4, the slot location may correspond to the slot holding resources for the first portion of the aperiodic reference signal 405, which is a non-consecutive slot with respect to the slot holding resources for the second portion of the aperiodic reference signal 405. The SCell activation message may be carried or otherwise conveyed, implicitly and/or explicitly, via a DCI and/or MAC CE.

As also discussed above, in some aspects the value of k may be based on the FR, the frequency band, the frequency band combination, the SCS, the BWP configuration, the TDD UL-DL configuration, and the like, of the to-be-activated SCell. Aperiodic reference signal configuration 400 illustrates a non-limiting example where the value of k is based at least in part on the TDD configuration of the to-be-activated SCell.

For example, the to-be-activated SCell may be configured using a TDD configuration where some slots are designated as downlink slots (D), as uplink slots (U), and/or as flexible slots (F). Aperiodic reference signal configuration 400 illustrates an example where, if slot n corresponding to the first portion of the aperiodic reference signal 405 is a downlink slot or a special slot than can map NZP-CSI-RS resources for the aperiodic reference signal 405 while slot n+k corresponding to the second portion of the aperiodic reference signal 405 is originally configured as an uplink slot that cannot map the NZP-CSI-RS resources for the aperiodic reference signal 405, then the NZP-CSI-RS resources for the n+k slot may be postponed to the next slot where the NZP-CSI-RS resources can be accommodated. Accordingly, in this example the value of k may be selected and/or updated based on the TDD UL-DL configuration of the to-be-activated SCell. As discussed above, the value of n and/or k may be implicitly and/or explicitly indicated to the UE.

Figure 5:
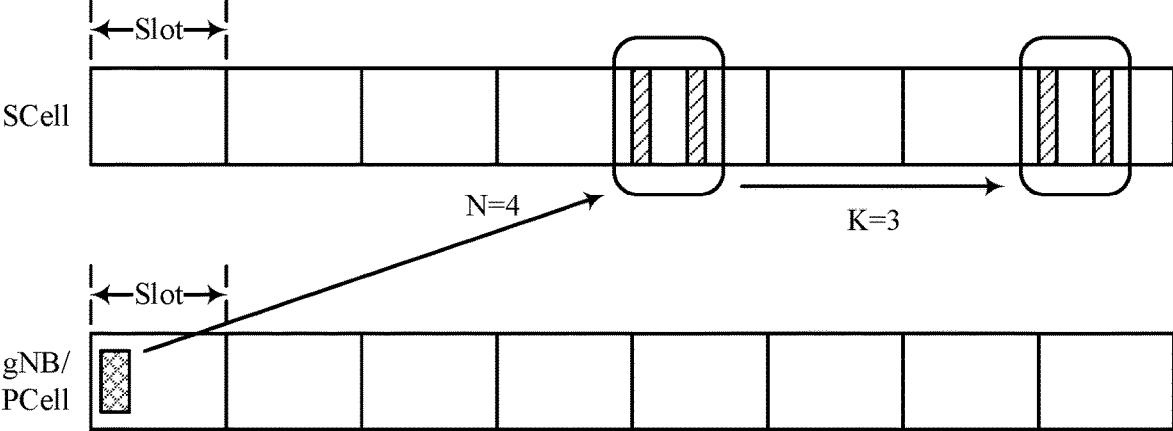
FIG. 5 illustrates an example of a aperiodic reference signal configuration that supports temporary reference signal for fast SCell activation in accordance with aspects of the present disclosure.
Figure 5:
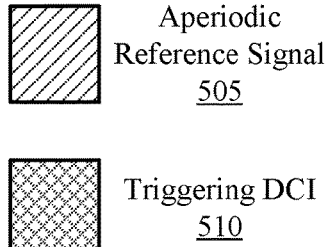
Figure 5:

FIG. 5 illustrates an example of a aperiodic reference signal configuration 500 that supports temporary reference signal for fast SCell activation in accordance with aspects of the present disclosure. Aperiodic reference signal configuration 500 may implement aspects of wireless communication systems 100 and/or 200 and/or aperiodic reference signal configurations 300 and/or 400. Aspects of aperiodic reference signal configuration 500 may be implemented at or implemented by a UE and/or base station, which may be examples of corresponding devices herein.

As discussed above, aspects of the described techniques provide for a base station (e.g., a PCell) to trigger transmissions of temporary reference signals (e.g., aperiodic reference signal 505) from an SCell being activated for a UE, with the aperiodic reference signal 505 being in non-consecutive slots. That is, the PCell may transmit an SCell activation message indicating that the SCell is to be activated at the UE in addition to the PCell. The SCell activation message may indicate and/or trigger identification of a slot location of a first portion of an aperiodic reference signal 505 for cell activation measurements (e.g., AGC) as well as a slot offset between the first portion of the aperiodic reference signal 505 and a second portion of the aperiodic reference signal 505 that is also used for cell activation measurements (e.g., fine tuning/tracking). The slot offset may correspond to a number of slots between the first portion and the second portion of the aperiodic reference signal 505. As illustrated in FIG. 5, the slot location may correspond to the slot holding resources for the first portion of the aperiodic reference signal 405, which is a non-consecutive slot with respect to the slot holding resources for the second portion of the aperiodic reference signal 405. The SCell activation message may be carried or otherwise conveyed, implicitly and/or explicitly, via a DCI and/or MAC CE, such as triggering DCI 510.

As also discussed above, in some aspects the value of k may be based on the FR, the frequency band, the frequency band combination, the SCS, the BWP configuration, the TDD UL-DL configuration, and the like, of the to-be-activated SCell. Aperiodic reference signal configuration 500 illustrates a non-limiting example where the value of n and k are explicitly indicated. That is, a configuration signal may be used to indicate the slot location and/or slot offset.

For example, the base station (e.g., PCell) may transmit triggering DCI 510 to the UE indicating the values of k and n. The triggering DCI 510 may be the same DCI activating the SCell for the UE in addition to the PCell or may be a different DCI. The triggering DCI 510 may carry or otherwise convey an indication of k and n using one or more fields. For example, a CSI request field may be used to indicate the value of n and k. That is, the combination of {n,k} values may be identified by the CSI request field. One non-limiting example, the CSI request field values may include a field value of "00" indicating {4,2} (e.g., n=4, k=2), a field value of "01" indicating {5,2}, a field value of "10" indicating {4,3}, and a field value of "11" indicating {5,3}. In the non-limiting example illustrated in FIG. 5, the triggering DCI 510 may indicate {4,3} for the to-be-activated SCell. Accordingly, the PCell may transmit a configuration signal to the UE indicating the slot offset, with the configuration signal including the DCI having a field indicating the slot offset and/or the slot location. The UE may measure the aperiodic reference signal 505 in the first portion and second portion (e.g., in non-consecutive slots) for cell acquisition to the SCell.

Figure 6:
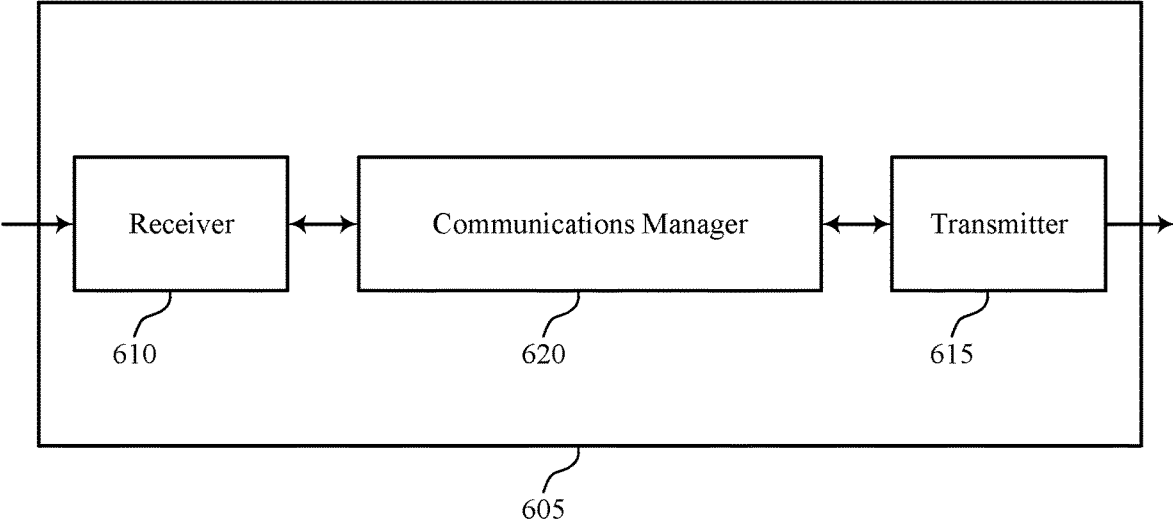
FIGS. 6 and 7 show block diagrams of devices that support temporary reference signal for fast SCell activation in accordance with aspects of the present disclosure.

FIG. 6 shows a block diagram 600 of a device 605 that supports temporary reference signal for fast SCell activation in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to temporary reference signal for fast SCell activation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to temporary reference signal for fast SCell activation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of temporary reference signal for fast SCell activation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, a SCell activation message that indicates a SCell is to be activated at the UE in addition to a primary cell. The communications manager 620 may be configured as or otherwise support a means for identifying, based on the SCell activation message, a slot location of a first portion of aperiodic reference signals for cell activation measurements and a slot offset between the first portion of the aperiodic reference signals and a second portion of the aperiodic reference signals, the slot offset including non-consecutive slots with respect to the slot location. The communications manager 620 may be configured as or otherwise support a means for measuring one or more characteristics of the SCell based on the aperiodic reference signals. In some examples, the slot location may be for a first plurality of slots carrying the first portion of aperiodic reference signals and the slot offset may be between the first plurality of slots and a second plurality of slots carrying the second portion of the aperiodic reference signals, such as illustrated in FIG. 3. In some examples, the timing domain pattern (e.g., symbols) used for the first portion of the aperiodic reference signals carried in the first plurality of slots may be reused (e.g., the same) for the second portion of the aperiodic reference signals carried in the second plurality of slots.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improving SCell activation procedures by scheduling non-consecutive slots with aperiodic reference signals to support AGC functions, frequency/phase tracking/tuning, and the like.

Figure 7:
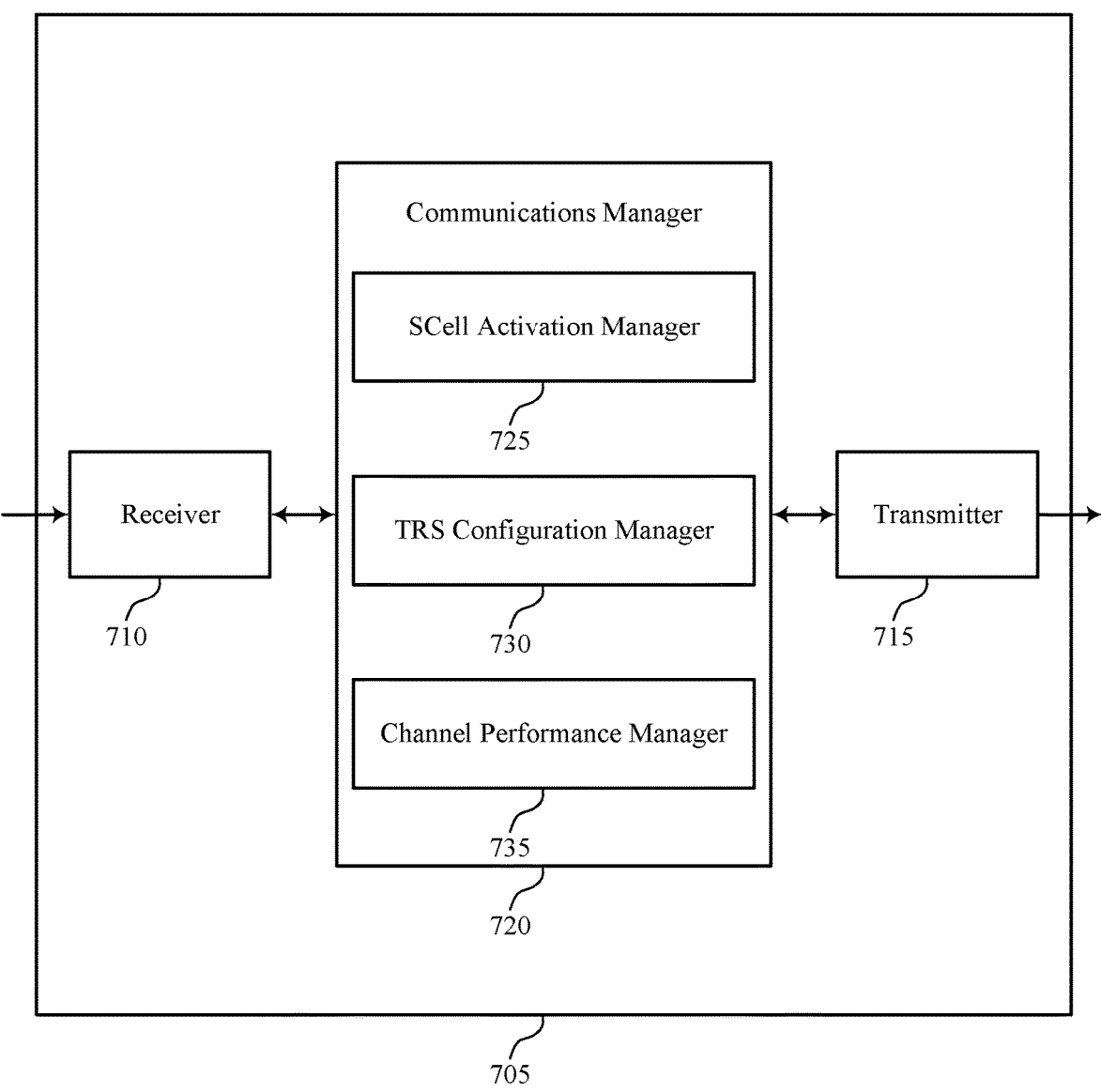

FIG. 7 shows a block diagram 700 of a device 705 that supports temporary reference signal for fast SCell activation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to temporary reference signal for fast SCell activation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to temporary reference signal for fast SCell activation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of temporary reference signal for fast SCell activation as described herein. For example, the communications manager 720 may include a SCell activation manager 725, an TRS configuration manager 730, a channel performance manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The SCell activation manager 725 may be configured as or otherwise support a means for receiving, from a base station, a SCell activation message that indicates a SCell is to be activated at the UE in addition to a primary cell. The TRS configuration manager 730 may be configured as or otherwise support a means for identifying, based on the SCell activation message, a slot location of a first portion of an aperiodic reference signal for cell activation measurements and a slot offset between the first portion of the aperiodic reference signal and a second portion of the aperiodic reference signal, the slot offset including non-consecutive slots with respect to the slot location. The channel performance manager 735 may be configured as or otherwise support a means for measuring one or more characteristics of the SCell based on the aperiodic reference signal. In some examples, the slot location may be for a first plurality of slots carrying the first portion of aperiodic reference signals and the slot offset may be between the first plurality of slots and a second plurality of slots carrying the second portion of the aperiodic reference signals, such as illustrated in FIG. 3. In some examples, the timing domain pattern (e.g., symbols) used for the first portion of the aperiodic reference signals carried in the first plurality of slots may be reused (e.g., the same) for the second portion of the aperiodic reference signals carried in the second plurality of slots.

Figure 8:
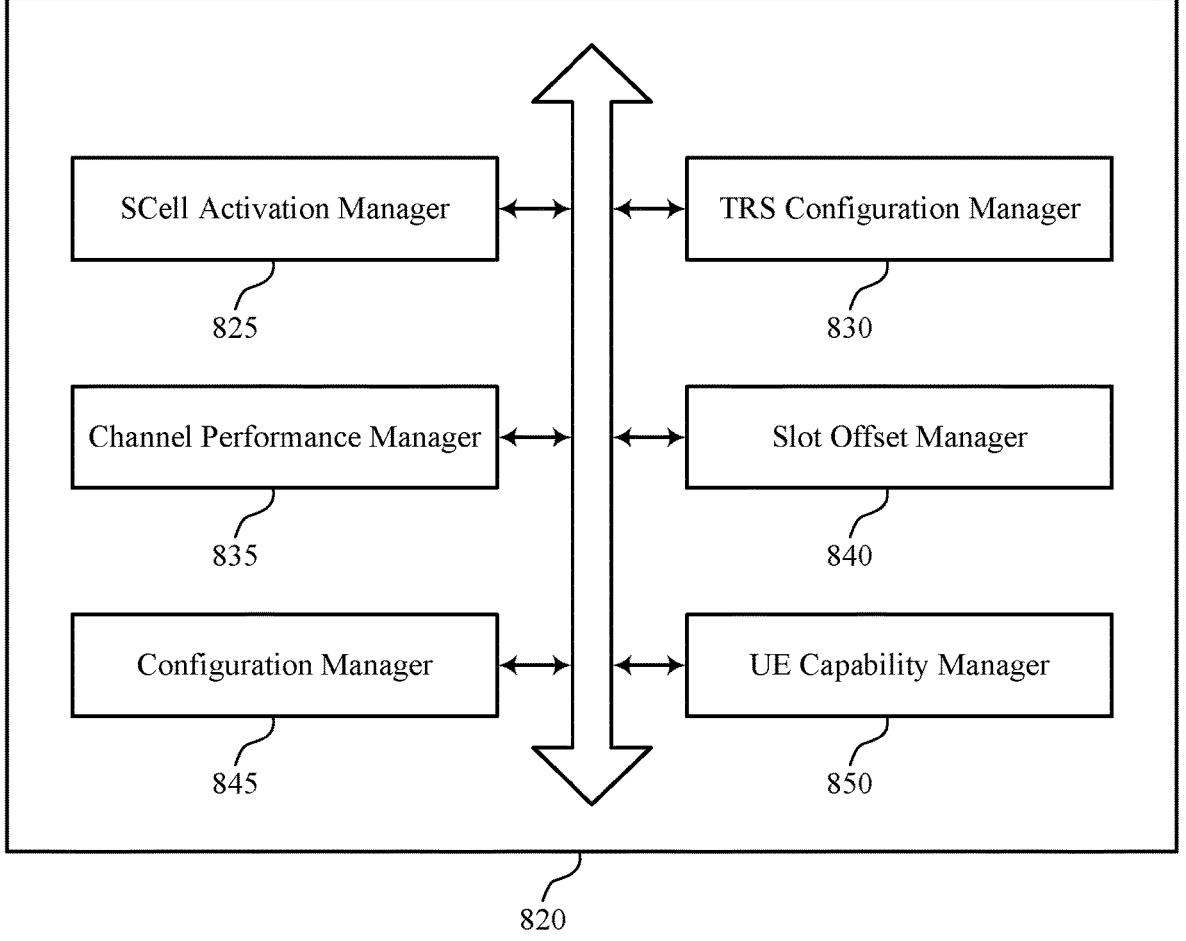
FIG. 8 shows a block diagram of a communications manager that supports temporary reference signal for fast SCell activation in accordance with aspects of the present disclosure.

FIG. 8 shows a block diagram 800 of a communications manager 820 that supports temporary reference signal for fast SCell activation in accordance with aspects of the present disclosure. The communications manager 820 may be an example of aspects of a communications manager 620, a communications manager 720, or both, as described herein. The communications manager 820, or various components thereof, may be an example of means for performing various aspects of temporary reference signal for fast SCell activation as described herein. For example, the communications manager 820 may include a SCell activation manager 825, an TRS configuration manager 830, a channel performance manager 835, a slot offset manager 840, a configuration manager 845, a UE capability manager 850, or any combination thereof. Each of these components may communicate, directly or indirectly, with one another (e.g., via one or more buses).

The communications manager 820 may support wireless communication at a UE in accordance with examples as disclosed herein. The SCell activation manager 825 may be configured as or otherwise support a means for receiving, from a base station, a SCell activation message that indicates a SCell is to be activated at the UE in addition to a primary cell. The TRS configuration manager 830 may be configured as or otherwise support a means for identifying, based on the SCell activation message, a slot location of a first portion of an aperiodic reference signal for cell activation measurements and a slot offset between the first portion of the aperiodic reference signal and a second portion of the aperiodic reference signal, the slot offset including non-consecutive slots with respect to the slot location. The channel performance manager 835 may be configured as or otherwise support a means for measuring one or more characteristics of the SCell based on the aperiodic reference signal.

In some examples, the slot location includes a first slot including resources for the first portion of the aperiodic reference signal and the slot offset identifies a second slot including resources for the second portion of the aperiodic reference signal, the second slot including a non-consecutive slot with respect to the first slot.

In some examples, the resources for the first portion of the aperiodic reference signal during the first slot use a different time domain pattern than the resources for the second portion of the aperiodic reference signal during the second slot.

In some examples, the slot location includes a first set of multiple slots, each slot in the first set of multiple slots including resources for a first instance of the aperiodic reference signal, and the slot offset identifies a second set of multiple slots, each slot in the second set of multiple slots including resources for a second instance of the aperiodic reference signal, the second set of multiple slots including non-consecutive slots with respect to the first set of multiple slots.

In some examples, the resources for the first instance of the aperiodic reference signal during the first set of multiple slots use a different time domain pattern than the resources for the second instance of the aperiodic reference signal during the second set of multiple slots.

In some examples, the slot offset manager 840 may be configured as or otherwise support a means for identifying the slot offset based on one or more of: a frequency range of the SCell, a frequency band of the SCell, a frequency band combination of the SCell, a subcarrier spacing of the SCell, a bandwidth part configuration of the SCell, a time-domain duplexing configuration of the SCell, or a combination thereof.

In some examples, the configuration manager 845 may be configured as or otherwise support a means for receiving a configuration signal indicating the slot offset.

In some examples, the configuration signal includes downlink control information including a field indicating the slot offset, the slot location, or both.

In some examples, the UE capability manager 850 may be configured as or otherwise support a means for transmitting a UE capability message indicating a minimum slot offset value of the UE, where the slot offset is based on the UE capability message.

In some examples, the UE capability manager 850 may be configured as or otherwise support a means for identifying the minimum slot offset value of the UE for at least one of a frequency range, a frequency band, a frequency band combination, a subcarrier spacing, a bandwidth part configuration, or a time domain duplexing configuration.

Figure 9:
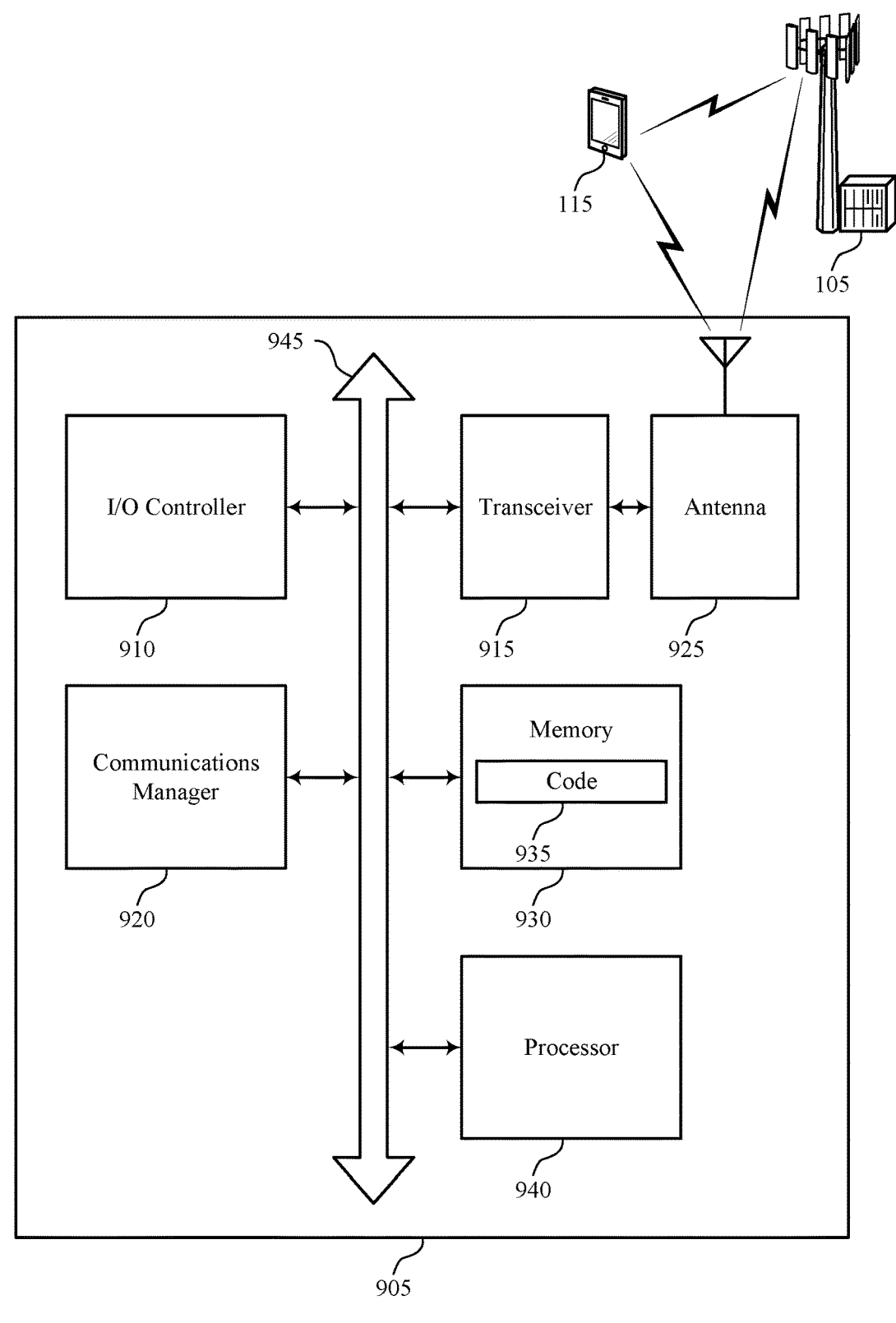
FIG. 9 shows a diagram of a system including a device that supports temporary reference signal for fast SCell activation in accordance with aspects of the present disclosure.

FIG. 9 shows a diagram of a system 900 including a device 905 that supports temporary reference signal for fast SCell activation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code

935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting temporary reference signal for fast SCell activation). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, a SCell activation message that indicates a SCell is to be activated at the UE in addition to a primary cell. The communications manager 920 may be configured as or otherwise support a means for identifying, based on the SCell activation message, a slot location of a first portion of aperiodic reference signals for cell activation measurements and a slot offset between the first portion of the aperiodic reference signals and a second portion of the aperiodic reference signals, the slot offset including non-consecutive slots with respect to the slot location. The communications manager 920 may be configured as or otherwise support a means for measuring one or more characteristics of the SCell based on the aperiodic reference signals.

By including or configuring the communications manager 920 in accordance with examples as described herein, the device 905 may support techniques for improving SCell activation procedures by scheduling non-consecutive slots with aperiodic reference signals to support AGC functions, frequency/phase tracking/tuning, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of temporary reference signal for fast SCell activation as described herein, or the processor 940 and the memory 930 may be otherwise configured to perform or support such operations.

Figure 10:
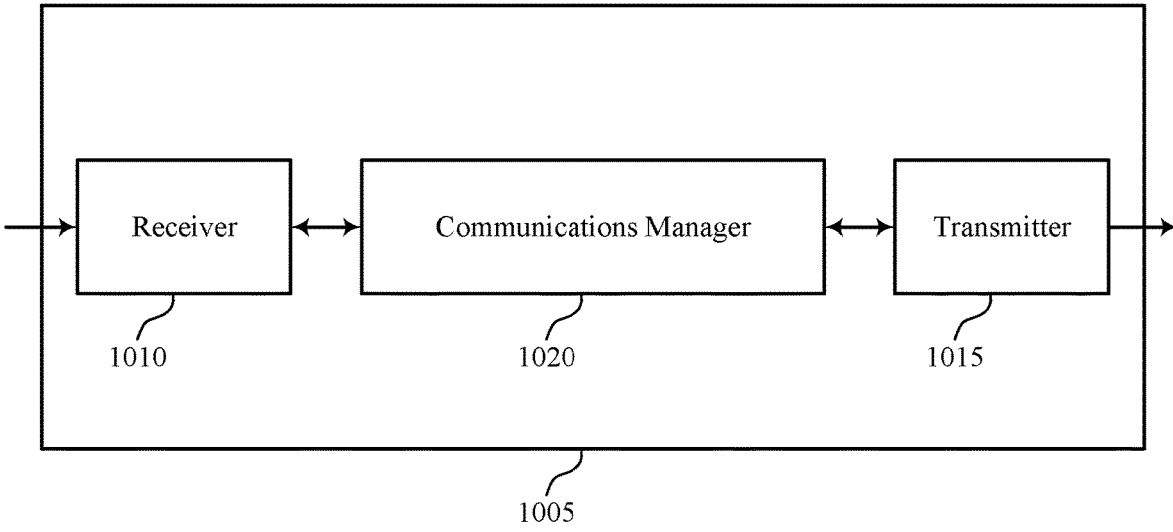
FIGS. 10 and 11 show block diagrams of devices that support temporary reference signal for fast SCell activation in accordance with aspects of the present disclosure.

FIG. 10 shows a block diagram 1000 of a device 1005 that supports temporary reference signal for fast SCell activation in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to temporary reference signal for fast SCell activation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to temporary reference signal for fast SCell activation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of temporary reference signal for fast SCell activation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a primary cell in accordance with examples as disclosed herein. For example, the communications manager 1020 may be configured as or otherwise support a means for identifying, for a UE, a slot location of a first portion of aperiodic reference signals for cell activation measurements of a SCell and a slot offset between the first portion of the aperiodic reference signals and a second portion of the aperiodic reference signals, the slot offset including non-consecutive slots with respect to the slot location. The communications manager 1020 may be configured as or otherwise support a means for transmitting, to the UE, a SCell activation message that indicates the SCell is to be activated at the UE in addition to the primary cell and triggers transmission of the aperiodic reference signals at the SCell according to the slot location and the slot offset. In some examples, the slot location may be for a first plurality of slots carrying the first portion of aperiodic reference signals and the slot offset may be between the first plurality of slots and a second plurality of slots carrying the second portion of the aperiodic reference signals, such as illustrated in FIG. 3. In some examples, the timing domain pattern (e.g., symbols) used for the first portion of the aperiodic reference signals carried in the first plurality of slots may be reused (e.g., the same) for the second portion of the aperiodic reference signals carried in the second plurality of slots.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for improving SCell activation procedures by scheduling non-consecutive slots with aperiodic reference signals to support AGC functions, frequency/phase tracking/tuning, and the like.

Figure 11:
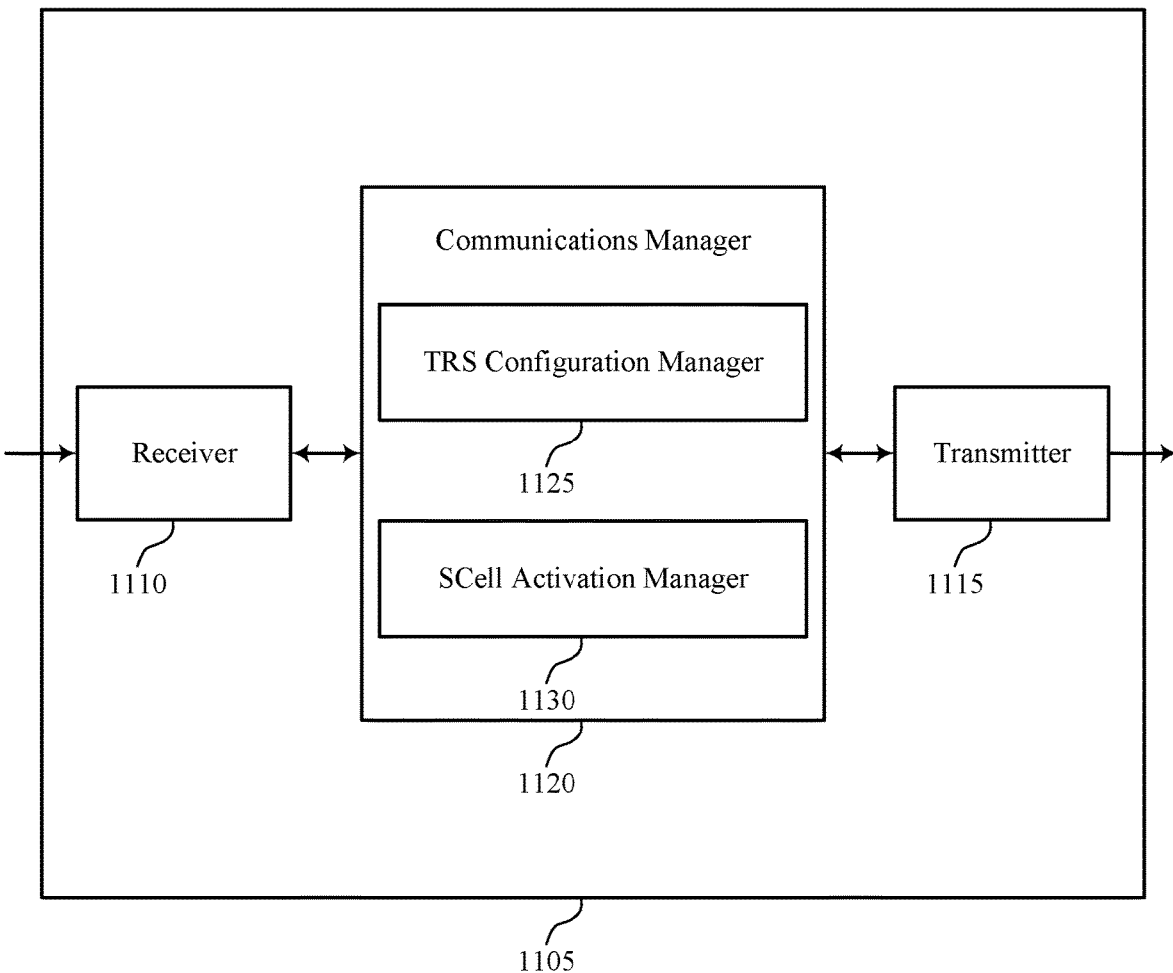

FIG. 11 shows a block diagram 1100 of a device 1105 that supports temporary reference signal for fast SCell activation in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to temporary reference signal for fast SCell activation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to temporary reference signal for fast SCell activation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of temporary reference signal for fast SCell activation as described herein. For example, the communications manager 1120 may include an TRS configuration manager 1125 a SCell activation manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a primary cell in accordance with examples as disclosed herein. The TRS configuration manager 1125 may be configured as or otherwise support a means for identifying, for a UE, a slot location of a first portion of aperiodic reference signals for cell activation measurements of a SCell and a slot offset between the first portion of the aperiodic reference signals and a second portion of the aperiodic reference signals, the slot offset including non-consecutive slots with respect to the slot location. The SCell activation manager 1130 may be configured as or otherwise support a means for transmitting, to the UE, a SCell activation message that indicates the SCell is to be activated at the UE in addition to the primary cell and triggers transmission of the aperiodic reference signals at the SCell according to the slot location and the slot offset.

Figure 12:
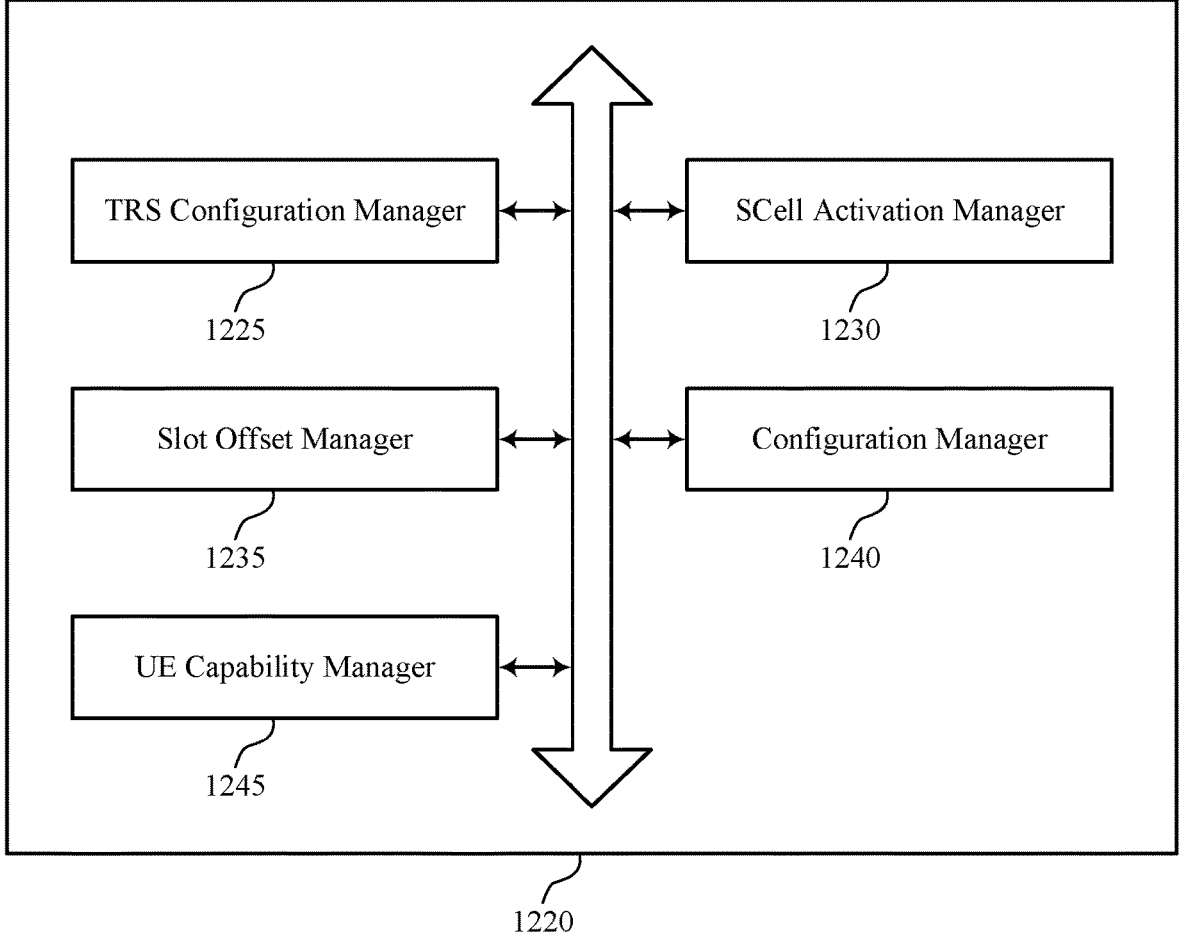
FIG. 12 shows a block diagram of a communications manager that supports temporary reference signal for fast SCell activation in accordance with aspects of the present disclosure.

FIG. 12 shows a block diagram 1200 of a communications manager 1220 that supports temporary reference signal for fast SCell activation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of temporary reference signal for fast SCell activation as described herein. For example, the communications manager 1220 may include an TRS configuration manager 1225, a SCell activation manager 1230, a slot offset manager 1235, a configuration manager 1240, a UE capability manager 1245, or any combination thereof. Each of these components may communicate, directly or indirectly, with one another (e.g., via one or more buses).

The communications manager 1220 may support wireless communication at a primary cell in accordance with examples as disclosed herein. The TRS configuration manager 1225 may be configured as or otherwise support a means for identifying, for a UE, a slot location of a first portion of an aperiodic reference signal for cell activation measurements of a SCell and a slot offset between the first portion of the aperiodic reference signal and a second portion of the aperiodic reference signal, the slot offset including non-consecutive slots with respect to the slot location. The SCell activation manager 1230 may be configured as or otherwise support a means for transmitting, to the UE, a SCell activation message that indicates the SCell is to be activated at the UE in addition to the primary cell and triggers transmission of the aperiodic reference signal at the SCell according to the slot location and the slot offset.

In some examples, the slot location includes a first slot including resources for the first portion of the aperiodic reference signal and the slot offset identifies a second slot including resources for the second portion of the aperiodic reference signal, the second slot including a non-consecutive slot with respect to the first slot.

In some examples, the resources for the first portion of the aperiodic reference signal during the first slot use a different time domain pattern than the resources for the second portion of the aperiodic reference signal during the second slot.

In some examples, the slot location includes a first set of multiple slots, each slot in the first set of multiple slots including resources for a first instance of the aperiodic reference signal, and the slot offset identifies a second set of multiple slots, each slot in the second set of multiple slots including resources for a second instance of the aperiodic reference signal, the second set of multiple slots including non-consecutive slots with respect to the first set of multiple slots.

In some examples, the resources for the first instance of the aperiodic reference signal during the first set of multiple slots use a different time domain pattern than the resources for the second instance of the aperiodic reference signal during the second set of multiple slots.

In some examples, the slot offset manager 1235 may be configured as or otherwise support a means for identifying the slot offset based on one or more of: a frequency range of the SCell, a frequency band of the SCell, a frequency band combination of the SCell, a subcarrier spacing of the SCell, a bandwidth part configuration of the SCell, a time-domain duplexing configuration of the SCell, or a combination thereof.

In some examples, the configuration manager 1240 may be configured as or otherwise support a means for transmitting a configuration signal indicating the slot offset.

In some examples, the configuration signal includes DCI including a field indicating the slot offset, the slot location, or both.

In some examples, the UE capability manager 1245 may be configured as or otherwise support a means for receiving a UE capability message indicating a minimum slot offset value of the UE, where the slot offset is based on the UE capability message.

In some examples, the UE capability manager 1245 may be configured as or otherwise support a means for identifying the minimum slot offset value of the UE for at least one of a frequency range, a frequency band, a frequency band combination, a subcarrier spacing, a bandwidth part configuration, or a time domain duplexing configuration.

Figure 13:
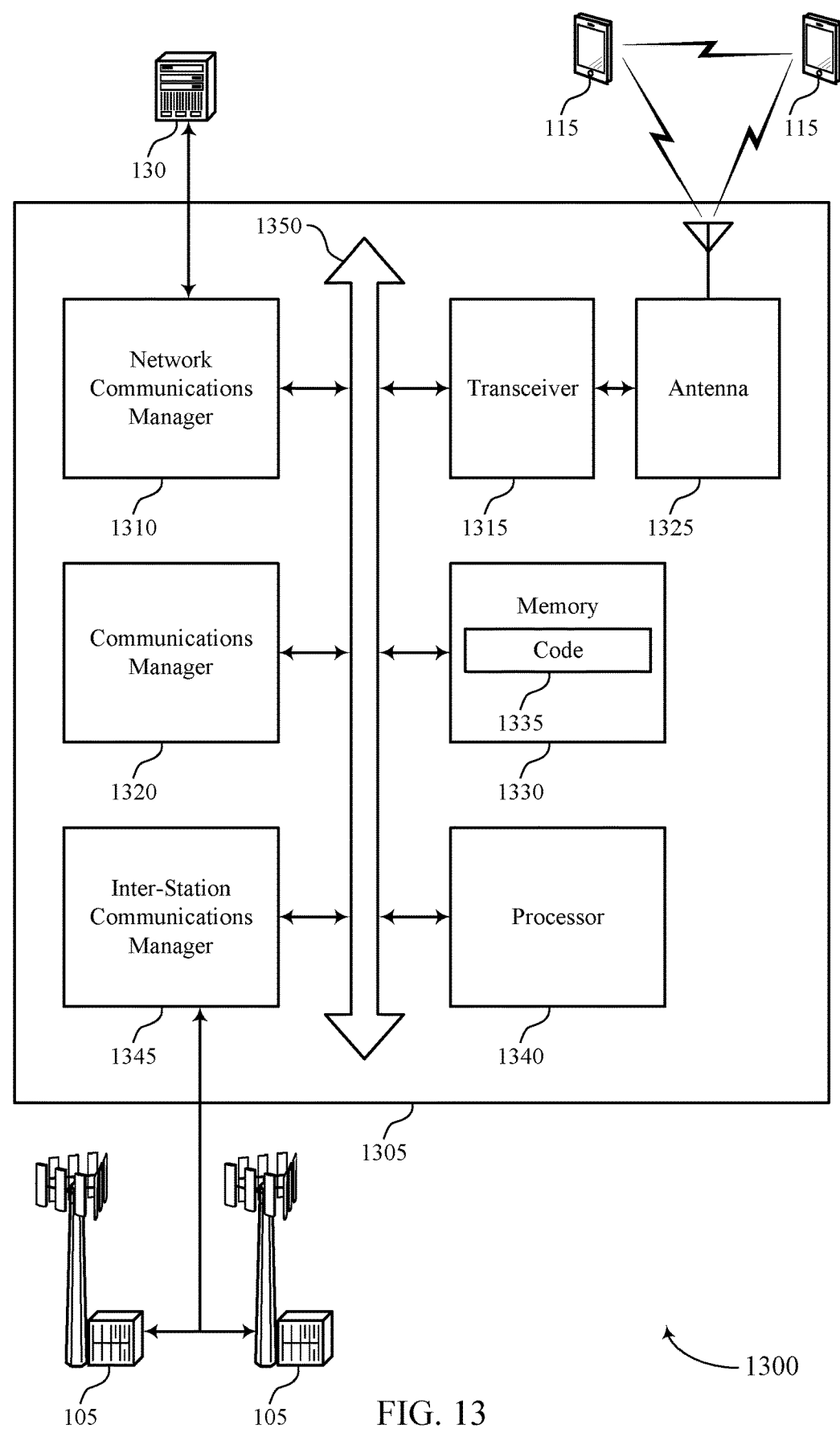
FIG. 13 shows a diagram of a system including a device that supports temporary reference signal for fast SCell activation in accordance with aspects of the present disclosure.

FIG. 13 shows a diagram of a system 1300 including a device 1305 that supports temporary reference signal for fast SCell activation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting temporary reference signal for fast SCell activation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a primary cell in accordance with examples as disclosed herein. For example, the communications manager 1320 may be configured as or otherwise support a means for identifying, for a UE, a slot location of a first portion of aperiodic reference signals for cell activation measurements of a SCell and a slot offset between the first portion of the aperiodic reference signals and a second portion of the aperiodic reference signals, the slot offset including non-consecutive slots with respect to the slot location. The communications manager 1320 may be configured as or otherwise support a means for transmitting, to the UE, a SCell activation message that indicates the SCell is to be activated at the UE in addition to the primary cell and triggers transmission of the aperiodic reference signals at the SCell according to the slot location and the slot offset. In some examples, the slot location may be for a first plurality of slots carrying the first portion of aperiodic reference signals and the slot offset may be between the first plurality of slots and a second plurality of slots carrying the second portion of the aperiodic reference signals, such as illustrated in FIG. 3. In some examples, the timing domain pattern (e.g., symbols) used for the first portion of the aperiodic reference signals carried in the first plurality of slots may be reused (e.g., the same) for the second portion of the aperiodic reference signals carried in the second plurality of slots.

By including or configuring the communications manager 1320 in accordance with examples as described herein, the device 1305 may support techniques for improving SCell activation procedures by scheduling non-consecutive slots with aperiodic reference signals to support AGC functions, frequency/phase tracking/tuning, and the like.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of temporary reference signal for fast SCell activation as described herein, or the processor 1340 and the memory 1330 may be otherwise configured to perform or support such operations.

FIG. 14 shows a flowchart illustrating a method 1400 that supports temporary reference signal for fast SCell activation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a base station, a SCell activation message that indicates a SCell is to be activated at the UE in addition to a primary cell. The operations of 1405 may be performed in accordance with examples as disclosed herein. In some examples, aspects of the operations of 1405 may be performed by a SCell activation manager 825 as described with reference to FIG. 8.

At 1410, the method may include identifying, based on the SCell activation message, a slot location of a first portion of aperiodic reference signals for cell activation measurements and a slot offset between the first portion of the aperiodic reference signals and a second portion of the aperiodic reference signals, the slot offset including non-consecutive slots with respect to the slot location. The operations of 1410 may be performed in accordance with examples as disclosed herein. In some examples, aspects of the operations of 1410 may be performed by an TRS configuration manager 830 as described with reference to FIG. 8. In some examples, the slot location may be for a first plurality of slots carrying the first portion of aperiodic reference signals and the slot offset may be between the first plurality of slots and a second plurality of slots carrying the second portion of the aperiodic reference signals, such as illustrated in FIG. 3. In some examples, the timing domain pattern (e.g., symbols) used for the first portion of the aperiodic reference signals carried in the first plurality of slots may be reused (e.g., the same) for the second portion of the aperiodic reference signals carried in the second plurality of slots.

At 1415, the method may include measuring one or more characteristics of the SCell based on the aperiodic reference signals. The operations of 1415 may be performed in accordance with examples as disclosed herein. In some examples, aspects of the operations of 1415 may be performed by a channel performance manager 835 as described with reference to FIG. 8.

FIG. 15 shows a flowchart illustrating a method 1500 that supports temporary reference signal for fast SCell activation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a base station, a SCell activation message that indicates a SCell is to be activated at the UE in addition to a primary cell. The operations of 1505 may be performed in accordance with examples as disclosed herein. In some examples, aspects of the operations of 1505 may be performed by a SCell activation manager 825 as described with reference to FIG. 8.

At 1510, the method may include identifying, based on the SCell activation message, a slot location of a first portion of aperiodic reference signals for cell activation measurements and a slot offset between the first portion of the aperiodic reference signals and a second portion of the aperiodic reference signals, the slot offset including non-consecutive slots with respect to the slot location. The operations of 1510 may be performed in accordance with examples as disclosed herein. In some examples, aspects of the operations of 1510 may be performed by an TRS configuration manager 830 as described with reference to FIG. 8.

At 1515, the method may include identifying the slot offset based on one or more of: a frequency range of the SCell, a frequency band of the SCell, a frequency band combination of the SCell, a subcarrier spacing of the SCell, a bandwidth part configuration of the SCell, a time-domain duplexing configuration of the SCell, or a combination thereof. The operations of 1515 may be performed in accordance with examples as disclosed herein. In some examples, aspects of the operations of 1515 may be performed by a slot offset manager 840 as described with reference to FIG. 8.

At 1520, the method may include measuring one or more characteristics of the SCell based on the aperiodic reference signals. The operations of 1520 may be performed in accordance with examples as disclosed herein. In some examples, aspects of the operations of 1520 may be performed by a channel performance manager 835 as described with reference to FIG. 8.

FIG. 16 shows a flowchart illustrating a method 1600 that supports temporary reference signal for fast SCell activation in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include transmitting a UE capability message indicating a minimum slot offset value of the UE, where the slot offset is based on the UE capability message. The operations of 1605 may be performed in accordance with examples as disclosed herein. In some examples, aspects of the operations of 1605 may be performed by a UE capability manager 850 as described with reference to FIG. 8.

At 1610, the method may include receiving, from a base station, a SCell activation message that indicates a SCell is to be activated at the UE in addition to a primary cell. The operations of 1610 may be performed in accordance with examples as disclosed herein. In some examples, aspects of the operations of 1610 may be performed by a SCell activation manager 825 as described with reference to FIG. 8.

At 1615, the method may include identifying, based on the SCell activation message, a slot location of a first portion of aperiodic reference signals for cell activation measurements and a slot offset between the first portion of the aperiodic reference signals and a second portion of the aperiodic reference signals, the slot offset including non-consecutive slots with respect to the slot location. The operations of 1615 may be performed in accordance with examples as disclosed herein. In some examples, aspects of the operations of 1615 may be performed by an TRS configuration manager 830 as described with reference to FIG. 8.

At 1620, the method may include measuring one or more characteristics of the SCell based on the aperiodic reference signals. The operations of 1620 may be performed in accordance with examples as disclosed herein. In some examples, aspects of the operations of 1620 may be performed by a channel performance manager 835 as described with reference to FIG. 8.

FIG. 17 shows a flowchart illustrating a method 1700 that supports temporary reference signal for fast SCell activation in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1705, the method may include identifying, for a UE, a slot location of a first portion of aperiodic reference signals for cell activation measurements of a SCell and a slot offset between the first portion of the aperiodic reference signals and a second portion of the aperiodic reference signals, the slot offset including non-consecutive slots with respect to the slot location. The operations of 1705 may be performed in accordance with examples as disclosed herein. In some examples, aspects of the operations of 1705 may be performed by an TRS configuration manager 1225 as described with reference to FIG. 12. In some examples, the slot location may be for a first plurality of slots carrying the first portion of aperiodic reference signals and the slot offset may be between the first plurality of slots and a second plurality of slots carrying the second portion of the aperiodic reference signals, such as illustrated in FIG. 3. In some examples, the timing domain pattern (e.g., symbols) used for the first portion of the aperiodic reference signals carried in the first plurality of slots may be reused (e.g., the same) for the second portion of the aperiodic reference signals carried in the second plurality of slots.

At 1710, the method may include transmitting, to the UE, a SCell activation message that indicates the SCell is to be activated at the UE in addition to the primary cell and triggers transmission of the aperiodic reference signals at the SCell according to the slot location and the slot offset. The operations of 1710 may be performed in accordance with examples as disclosed herein. In some examples, aspects of the operations of 1710 may be performed by a SCell activation manager 1230 as described with reference to FIG. 12.

FIG. 18 shows a flowchart illustrating a method 1800 that supports temporary reference signal for fast SCell activation in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1805, the method may include identifying, for a UE, a slot location of a first portion of aperiodic reference signals for cell activation measurements of a SCell and a slot offset between the first portion of the aperiodic reference signals and a second portion of the aperiodic reference signals, the slot offset including non-consecutive slots with respect to the slot location. The operations of 1805 may be performed in accordance with examples as disclosed herein. In some examples, aspects of the operations of 1805 may be performed by an TRS configuration manager 1225 as described with reference to FIG. 12.

At 1810, the method may include transmitting a configuration signal indicating the slot offset. The operations of 1810 may be performed in accordance with examples as disclosed herein. In some examples, aspects of the operations of 1810 may be performed by a configuration manager 1240 as described with reference to FIG. 12.

At 1815, the method may include transmitting, to the UE, a SCell activation message that indicates the SCell is to be activated at the UE in addition to the primary cell and triggers transmission of the aperiodic reference signals at the SCell according to the slot location and the slot offset. The operations of 1815 may be performed in accordance with examples as disclosed herein. In some examples, aspects of the operations of 1815 may be performed by a SCell activation manager 1230 as described with reference to FIG. 12.

The following provides an overview of aspects of the present disclosure:

Aspect 1: A method for wireless communication at a UE, comprising: receiving, from a base station, a SCell activation message that indicates a SCell is to be activated at the UE in addition to a PCell; identifying, based at least in part on the SCell activation message, a slot location for a first plurality of slots carrying a first portion of aperiodic reference signals for cell activation measurements and a slot offset between the first plurality of slots and a second plurality of slots carrying a second portion of the aperiodic reference signals, the slot offset comprising non-consecutive slots and the second portion of aperiodic reference signals in the second plurality of slots using a same set of symbols as the first portion of aperiodic reference signals in the first plurality of slots; and measuring one or more characteristics of the SCell based at least in part on the aperiodic reference signals.

Aspect 2: The method of aspect 1, wherein the SCell activation message is received in a MAC CE, a DCI message, or both.

Aspect 3: The method of any of aspects 1 through 2, further comprising: identifying the slot offset based at least in part on one or more of: a frequency range of the SCell, a frequency band of the SCell, a frequency band combination of the SCell, a subcarrier spacing of the SCell, a bandwidth part configuration of the SCell, a time-domain duplexing configuration of the SCell, or a combination thereof.

Aspect 4: The method of any of aspects 1 through 3, further comprising: receiving a configuration signal indicating the slot offset.

Aspect 5: The method of aspect 4, wherein the configuration signal comprises downlink control information including a field indicating the slot offset, the slot location, or both.

Aspect 6: The method of any of aspects 1 through 5, further comprising: transmitting a UE capability message indicating a minimum slot offset value of the UE, wherein the slot offset is based at least in part on the UE capability message.

Aspect 7: The method of aspect 6, further comprising: identifying the minimum slot offset value of the UE for at least one of a frequency range, a frequency band, a frequency band combination, a subcarrier spacing, a bandwidth part configuration, or a time domain duplexing configuration.

Aspect 8: A method for wireless communication at a PCell, comprising: identifying, for a UE, a slot location for a first plurality of slots carrying a first portion of aperiodic reference signals for cell activation measurements of a SCell and a slot offset between the first plurality of slots and a second plurality of slots carrying a second portion of the aperiodic reference signals, the slot offset comprising non-consecutive slots and the second portion of aperiodic reference signals in the second plurality of slots using a same set of symbols as the first portion of aperiodic reference signals in the first plurality of slots; and transmitting, to the UE, a SCell activation message that indicates the SCell is to be activated at the UE in addition to the PCell and triggers transmission of the aperiodic reference signals at the SCell according to the slot location and the slot offset.

Aspect 9: The method of aspect 8, wherein the SCell activation message is transmitted in a MAC CE, a DCI message, or both.

Aspect 10: The method of any of aspects 8 through 9, further comprising: identifying the slot offset based at least in part on one or more of: a frequency range of the SCell, a frequency band of the SCell, a frequency band combination of the SCell, a subcarrier spacing of the SCell, a bandwidth part configuration of the SCell, a time-domain duplexing configuration of the SCell, or a combination thereof.

Aspect 11: The method of any of aspects 8 through 10, further comprising: transmitting a configuration signal indicating the slot offset.

Aspect 12: The method of aspect 11, wherein the configuration signal comprises downlink control information including a field indicating the slot offset, the slot location, or both.

Aspect 13: The method of any of aspects 8 through 12, further comprising: receiving a UE capability message indicating a minimum slot offset value of the UE, wherein the slot offset is based at least in part on the UE capability message.

Aspect 14: The method of aspect 13, further comprising: identifying the minimum slot offset value of the UE for at least one of a frequency range, a frequency band, a frequency band combination, a subcarrier spacing, a bandwidth part configuration, or a time domain duplexing configuration.

Aspect 15: An apparatus for wireless communication at a UE, comprising a processor; memory coupled with the processor; and instructions stored in the memory and executable by the processor to cause the apparatus to perform a method of any of aspects 1 through 7.

Aspect 16: An apparatus for wireless communication at a UE, comprising at least one means for performing a method of any of aspects 1 through 7.

Aspect 17: A non-transitory computer-readable medium storing code for wireless communication at a UE, the code comprising instructions executable by a processor to perform a method of any of aspects 1 through 7.

Aspect 18: An apparatus for wireless communication at a PCell, comprising a processor; memory coupled with the processor; and instructions stored in the memory and executable by the processor to cause the apparatus to perform a method of any of aspects 8 through 14.

Aspect 19: An apparatus for wireless communication at a PCell, comprising at least one means for performing a method of any of aspects 8 through 14.

Aspect 20: A non-transitory computer-readable medium storing code for wireless communication at a PCell, the code comprising instructions executable by a processor to perform a method of any of aspects 8 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving a secondary cell activation message that indicates a secondary cell is to be activated at the UE, and wherein the secondary cell activation message further indicates a slot location for a first plurality of slots, a slot offset which indicates a quantity of slots between the first plurality of slots and a second plurality of slots, and a set of non-zero power reference signal resources indicated by a tracking reference signal (TRS) information parameter, the set of non-zero power reference signal resources configured for aperiodic reference signals of the secondary cell for cell activation measurements of the secondary cell;

identifying, based at least in part on the secondary cell activation message, the slot location for the first plurality of slots carrying a first portion of the aperiodic reference signals of the secondary cell for the cell activation measurements of the secondary cell and the slot offset between the first plurality of slots and the second plurality of slots, the second plurality of slots carrying a second portion of the aperiodic reference signals of the secondary cell for the cell activation measurements of the secondary cell, and the slot offset comprising an indication of non-consecutive slots and the second portion of the aperiodic reference signals using a same symbol pattern as the first portion of the aperiodic reference signals; and measuring one or more characteristics of the secondary cell based at least in part on the aperiodic reference signals received via the set of non-zero power reference signal resources.

2. The method of claim 1, wherein the secondary cell activation message is received in a medium access control (MAC) control element (CE), a downlink control information (DCI) message, or both.

3. The method of claim 1, further comprising:

identifying the slot offset based at least in part on one or more of: a frequency range of the secondary cell, a frequency band of the secondary cell, a frequency band combination of the secondary cell, a subcarrier spacing of the secondary cell, a bandwidth part configuration of the secondary cell, a time-domain duplexing configuration of the secondary cell, or a combination thereof.

4. The method of claim 1, further comprising:

receiving a configuration signal indicating the slot offset.

5. The method of claim 4, wherein the configuration signal comprises downlink control information including a field indicating the slot offset, the slot location, or both.

6. The method of claim 1, further comprising:

transmitting a UE capability message indicating a minimum slot offset value of the UE, wherein the slot offset is based at least in part on the UE capability message.

7. The method of claim 6, further comprising:

identifying the minimum slot offset value of the UE for at least one of a frequency range, a frequency band, a frequency band combination, a subcarrier spacing, a bandwidth part configuration, or a time domain duplexing configuration.

8. A method for wireless communication at a primary cell, comprising:

identifying, for a user equipment (UE), a slot location for a first plurality of slots carrying a first portion of aperiodic reference signals of a secondary cell for cell activation measurements of the secondary cell and a slot offset between the first plurality of slots and a second plurality of slots, the second plurality of slots carrying a second portion of the aperiodic reference signals of the secondary cell for the cell activation measurements of the secondary cell, the slot offset comprising an indication of non-consecutive slots and the second portion of the aperiodic reference signals using a same symbol pattern as the first portion of the aperiodic reference signals; and transmitting, to the UE, a secondary cell activation message that indicates the secondary cell is to be activated at the UE in addition to the primary cell and triggers transmission of the aperiodic reference signals at the secondary cell according to the slot location and the slot offset, wherein the secondary cell activation message further indicates the slot location for the first plurality of slots, the slot offset which indicates a quantity of slots between the first plurality of slots and the second plurality of slots, and a set of non-zero power reference signal resources indicated by a tracking reference signal (TRS) information parameter, the set of non-zero power reference signal resources configured for the aperiodic reference signals of the secondary cell for the cell activation measurements of the secondary cell.

9. The method of claim 8, wherein the secondary cell activation message is transmitted in a medium access control (MAC) control element (CE), a downlink control information (DCI) message, or both.

10. The method of claim 8, further comprising:

identifying the slot offset based at least in part on one or more of: a frequency range of the secondary cell, a frequency band of the secondary cell, a frequency band combination of the secondary cell, a subcarrier spacing of the secondary cell, a bandwidth part configuration of the secondary cell, a time-domain duplexing configuration of the secondary cell, or a combination thereof.

11. The method of claim 8, further comprising:

transmitting a configuration signal indicating the slot offset.

12. The method of claim 11, wherein the configuration signal comprises downlink control information including a field indicating the slot offset, the slot location, or both.

13. The method of claim 8, further comprising:

receiving a UE capability message indicating a minimum slot offset value of the UE, wherein the slot offset is based at least in part on the UE capability message.

14. The method of claim 13, further comprising:

identifying the minimum slot offset value of the UE for at least one of a frequency range, a frequency band, a frequency band combination, a subcarrier spacing, a bandwidth part configuration, or a time domain duplexing configuration.

15. An apparatus for wireless communication at a user equipment (UE), comprising:

at least one processor;

at least one memory coupled with the at least one processor; and instructions stored in the at least one memory and executable by the at least one processor to cause the UE to:

receive a secondary cell activation message that indicates a secondary cell is to be activated at the UE, and wherein the secondary cell activation message further indicates a slot location for a first plurality of slots, a slot offset which indicates a quantity of slots between the first plurality of slots and a second plurality of slots, and a set of non-zero power reference signal resources indicated by a tracking reference signal (TRS) information parameter, the set of non-zero power reference signal resources configured for aperiodic reference signals of the secondary cell for cell activation measurements of the secondary cell;

identify, based at least in part on the secondary cell activation message, the slot location for the first plurality of slots carrying a first portion of the aperiodic reference signals of the secondary cell for the cell activation measurements of the secondary cell and the slot offset between the first plurality of slots and the second plurality of slots, the second plurality of slots carrying a second portion of the aperiodic reference signals of the secondary cell for the cell activation measurements of the secondary cell, the slot offset comprising an indication of non-consecutive slots and the second portion of the aperiodic reference signals using a same symbol pattern as the first portion of the aperiodic reference signals; and measure one or more characteristics of the secondary cell based at least in part on the aperiodic reference signals received via the set of non-zero power reference signal resources.

16. The apparatus of claim 15, wherein the secondary cell activation message is received in a medium access control (MAC) control element (CE), a downlink control information (DCI) message, or both.

17. The apparatus of claim 15, wherein the instructions are further executable by the at least one processor to cause the UE to:

identify the slot offset based at least in part on one or more of: a frequency range of the secondary cell, a frequency band of the secondary cell, a frequency band combination of the secondary cell, a subcarrier spacing of the secondary cell, a bandwidth part configuration of the secondary cell, a time-domain duplexing configuration of the secondary cell, or a combination thereof.

18. The apparatus of claim 15, wherein the instructions are further executable by the at least one processor to cause the UE to:

receive a configuration signal indicating the slot offset.

19. The apparatus of claim 18, wherein the configuration signal comprises downlink control information including a field indicating the slot offset, the slot location, or both.

20. The apparatus of claim 15, wherein the instructions are further executable by the at least one processor to cause the UE to:

transmit a UE capability message indicating a minimum slot offset value of the UE, wherein the slot offset is based at least in part on the UE capability message.

21. The apparatus of claim 20, wherein the instructions are further executable by the at least one processor to cause the UE to:

identify the minimum slot offset value of the UE for at least one of a frequency range, a frequency band, a frequency band combination, a subcarrier spacing, a bandwidth part configuration, or a time domain duplexing configuration.

22. An apparatus for wireless communication at a primary cell, comprising:

at least one processor;

at least one memory coupled with the at least one processor; and instructions stored in the at least one memory and executable by the at least one processor to cause the primary cell to:

identify, for a user equipment (UE), a slot location for a first plurality of slots carrying a first portion of aperiodic reference signals of a secondary cell for cell activation measurements of the secondary cell and a slot offset between the first plurality of slots and a second plurality of slots, the second plurality of slots carrying a second portion of the aperiodic reference signals of the secondary cell for the cell activation measurements of the secondary cell, the slot offset comprising an indication of non-consecutive slots and the second portion of the aperiodic reference signals using a same symbol pattern as the first portion of the aperiodic reference signals; and transmit, to the UE, a secondary cell activation message that indicates the secondary cell is to be activated at the UE in addition to the primary cell and triggers transmission of the aperiodic reference signals at the secondary cell according to the slot location and the slot offset, and wherein the secondary cell activation message further indicates the slot location for the first plurality of slots and the slot offset indicates a quantity of slots between the first plurality of slots and the second plurality of slots, the slot offset which indicates a quantity of slots between the first plurality of slots and the second plurality of slots, and a set of non-zero power reference signal resources indicated by a tracking reference signal (TRS) information parameter, the set of non-zero power reference signal resources configured for the aperiodic reference signals of the secondary cell for the cell activation measurements of the secondary cell.

23. The apparatus of claim 22, wherein the secondary cell activation message is transmitted in a medium access control (MAC) control element (CE), a downlink control information (DCI) message, or both.

24. The apparatus of claim 22, wherein the instructions are further executable by the at least one processor to cause the primary cell to:

identify the slot offset based at least in part on one or more of: a frequency range of the secondary cell, a frequency band of the secondary cell, a frequency band combination of the secondary cell, a subcarrier spacing of the secondary cell, a bandwidth part configuration of the secondary cell, a time-domain duplexing configuration of the secondary cell, or a combination thereof.

25. The apparatus of claim 22, wherein the instructions are further executable by the at least one processor to cause the primary cell to:

transmit a configuration signal indicating the slot offset.

26. The apparatus of claim 25, wherein the configuration signal comprises downlink control information including a field indicating the slot offset, the slot location, or both.

27. The apparatus of claim 22, wherein the instructions are further executable by the at least one processor to cause the primary cell to:

receive a UE capability message indicating a minimum slot offset value of the UE, wherein the slot offset is based at least in part on the UE capability message.

28. The apparatus of claim 27, wherein the instructions are further executable by the at least one processor to cause the primary cell to:

identify the minimum slot offset value of the UE for at least one of a frequency range, a frequency band, a frequency band combination, a subcarrier spacing, a bandwidth part configuration, or a time domain duplexing configuration.

29. An apparatus for wireless communication at a user equipment (UE), comprising:

means for receiving a secondary cell activation message that indicates a secondary cell is to be activated at the UE, and wherein the secondary cell activation message further indicates a slot location for a first plurality of slots, a slot offset which indicates a quantity of slots between the first plurality of slots and a second plurality of slots, and a set of non-zero power reference signal resources indicated by a tracking reference signal (TRS) information parameter, the set of non-zero power reference signal resources configured for aperiodic reference signals of the secondary cell for cell activation measurements of the secondary cell;

means for identifying, based at least in part on the secondary cell activation message, the slot location for the first plurality of slots carrying a first portion of the aperiodic reference signals of the secondary cell for the cell activation measurements of the secondary cell and the slot offset between the first plurality of slots and the second plurality of slots, the second plurality of slots carrying a second portion of the aperiodic reference signals of the secondary cell for the cell activation measurements of the secondary cell, the slot offset comprising an indication of non-consecutive slots and the second portion of the aperiodic reference signals using a same symbol pattern as the first portion of the aperiodic reference signals; and means for measuring one or more characteristics of the secondary cell based at least in part on the aperiodic reference signals received via the set of non-zero power reference signal resources.

30. An apparatus for wireless communication at a primary cell, comprising:

means for identifying, for a user equipment (UE), a slot location for a first plurality of slots carrying a first portion of aperiodic reference signals of a secondary cell for cell activation measurements of the secondary cell and a slot offset between the first plurality of slots and a second plurality of slots, the second plurality of slots carrying a second portion of the aperiodic reference signals of the secondary cell for the cell activation measurements of the secondary cell, the slot offset comprising an indication of non-consecutive slots and the second portion of the aperiodic reference signals using a same symbol pattern as the first portion of the aperiodic reference signals; and means for transmitting, to the UE, a secondary cell activation message that indicates the secondary cell is to be activated at the UE in addition to the primary cell and triggers transmission of the aperiodic reference signals at the secondary cell according to the slot location and the slot offset, and wherein the secondary cell activation message further indicates the slot location for the first plurality of slots, the slot offset which indicates a quantity of slots between the first plurality of slots and the second plurality of slots, and a set of non-zero power reference signal resources indicated by a tracking reference signal (TRS) information parameter, the set of non-zero power reference signal resources configured for the aperiodic reference signals of the secondary cell for the cell activation measurements of the secondary cell.

31. A non-transitory computer-readable medium storing code for wireless communication at a user equipment (UE), the code comprising instructions executable by at least one processor to:

receive a secondary cell activation message that indicates a secondary cell is to be activated at the UE, and wherein the secondary cell activation message further indicates a slot location for a first plurality of slots, a slot offset which indicates a quantity of slots between the first plurality of slots and a second plurality of slots, and a set of non-zero power reference signal resources indicated by a tracking reference signal (TRS) information parameter, the set of non-zero power reference signal resources configured for aperiodic reference signals of the secondary cell for cell activation measurements of the secondary cell;

identify, based at least in part on the secondary cell activation message, the slot location for the first plurality of slots carrying a first portion of the aperiodic reference signals of the secondary cell for the cell activation measurements of the secondary cell and the slot offset between the first plurality of slots and the second plurality of slots, the second plurality of slots carrying a second portion of the aperiodic reference signals of the secondary cell for the cell activation measurements of the secondary cell, the slot offset comprising an indication of non-consecutive slots and the second portion of the aperiodic reference signals using a same symbol pattern as the first portion of the aperiodic reference signals; and measure one or more characteristics of the secondary cell based at least in part on the aperiodic reference signals received via the set of non-zero power reference signal resources.

32. A non-transitory computer-readable medium storing code for wireless communication at a primary cell, the code comprising instructions executable by at least one processor to:

identify, for a user equipment (UE), a slot location for a first plurality of slots carrying a first portion of aperiodic reference signals of a secondary cell for cell activation measurements of the secondary cell and a slot offset between the first plurality of slots and a second plurality of slots, the second plurality of slots carrying a second portion of the aperiodic reference signals of the secondary cell for the cell activation measurements of the secondary cell, the slot offset comprising an indication of non-consecutive slots and the second portion of the aperiodic reference signals using a same symbol pattern as the first portion of the aperiodic reference signals; and transmit, to the UE, a secondary cell activation message that indicates the secondary cell is to be activated at the UE in addition to the primary cell and triggers transmission of the aperiodic reference signals at the secondary cell according to the slot location and the slot offset, and wherein the secondary cell activation message further indicates the slot location for the first plurality of slots, the slot offset which indicates a quantity of slots between the first plurality of slots and the second plurality of slots, and a set of non-zero power reference signal resources indicated by a tracking reference signal (TRS) information parameter, the set of non-zero power reference signal resources configured for the aperiodic reference signals of the secondary cell for the cell activation measurements of the secondary cell.

* * * * *